United States Patent
Tsai et al.

(10) Patent No.: US 11,457,505 B2
(45) Date of Patent: *Sep. 27, 2022

(54) METHOD AND APPARATUS OF BEAM INDICATION IN A WIRELESS COMMUNICATION SYSTEM

(71) Applicant: ASUSTek Computer Inc., Taipei (TW)

(72) Inventors: Hsin-Hsi Tsai, Taipei (TW); Yu-Hsuan Guo, Taipei (TW); Jia-Hong Liou, Taipei (TW)

(73) Assignee: ASUSTek Computer Inc., Taipei (TW)

( * ) Notice: Subject to any disclaimer, the term of this patent is extended or adjusted under 35 U.S.C. 154(b) by 89 days.

This patent is subject to a terminal disclaimer.

(21) Appl. No.: 17/073,343

(22) Filed: Oct. 17, 2020

(65) Prior Publication Data
US 2021/0105860 A1  Apr. 8, 2021

Related U.S. Application Data

(63) Continuation of application No. 16/710,611, filed on Dec. 11, 2019, now Pat. No. 10,849,187.

(60) Provisional application No. 62/780,074, filed on Dec. 14, 2018.

(51) Int. Cl.
| | |
|---|---|
| *H04W 80/02* | (2009.01) |
| *H04W 76/11* | (2018.01) |
| *H04L 1/16* | (2006.01) |
| *H04L 5/00* | (2006.01) |
| *H04W 72/04* | (2009.01) |
| *H04W 72/12* | (2009.01) |

(52) U.S. Cl.
CPC .......... *H04W 80/02* (2013.01); *H04L 1/1614* (2013.01); *H04L 5/0092* (2013.01); *H04W 72/042* (2013.01); *H04W 72/1273* (2013.01); *H04W 76/11* (2018.02)

(58) Field of Classification Search
CPC ... H04W 80/02; H04W 76/11; H04W 72/042; H04W 72/1273; H04L 1/1614; H04L 5/0092
See application file for complete search history.

(56) References Cited

U.S. PATENT DOCUMENTS

| | | | |
|---|---|---|---|
| 10,849,187 B2 * | 11/2020 | Tsai | H04W 72/042 |
| 2019/0260532 A1 * | 8/2019 | Manolakos | H04W 72/042 |

* cited by examiner

*Primary Examiner* — Eric Myers
(74) *Attorney, Agent, or Firm* — Skaar Ulbrich Macari, P.A.

(57) ABSTRACT

A method and apparatus are disclosed from the perspective of a UE (User Equipment). In one embodiment, the method includes the UE receiving a first MAC-CE (Medium Access Control-Control Element) including or indicating a plurality of TCI (Transmission Configuration Indication) state IDs (Identities) to be activated for receiving PDSCH (Physical Downlink Shared Channel), wherein format of the first MAC-CE depends on amount of the plurality of TCI state IDs. The method further includes the UE activating a plurality of TCI states associated with the plurality of TCI state IDs included or indicated in the first MAC-CE for receiving the PDSCH in response to reception of the first MAC-CE.

17 Claims, 18 Drawing Sheets

METHOD AND APPARATUS OF BEAM INDICATION IN A WIRELESS COMMUNICATION SYSTEM

CROSS-REFERENCE TO RELATED APPLICATIONS

The present Application is a continuation of U.S. patent application Ser. No. 16/710,611, filed Dec. 11, 2019, which claims priority to and the benefit of U.S. Provisional Patent Application Ser. No. 62/780,074, filed Dec. 14, 2018, with the entire disclosure of each hereby fully incorporated by reference herein.

FIELD

This disclosure generally relates to wireless communication networks, and more particularly, to a method and apparatus of beam indication in a wireless communication system.

BACKGROUND

With the rapid rise in demand for communication of large amounts of data to and from mobile communication devices, traditional mobile voice communication networks are evolving into networks that communicate with Internet Protocol (IP) data packets. Such IP data packet communication can provide users of mobile communication devices with voice over IP, multimedia, multicast and on-demand communication services.

An exemplary network structure is an Evolved Universal Terrestrial Radio Access Network (E-UTRAN). The E-UTRAN system can provide high data throughput in order to realize the above-noted voice over IP and multimedia services. A new radio technology for the next generation (e.g., 5G) is currently being discussed by the 3GPP standards organization. Accordingly, changes to the current body of 3GPP standard are currently being submitted and considered to evolve and finalize the 3GPP standard.

SUMMARY

A method and apparatus are disclosed from the perspective of a UE (User Equipment). In one embodiment, the method includes the UE receiving a first MAC-CE (Medium Access Control-Control Element) including or indicating a plurality of TCI (Transmission Configuration Indication) state IDs (Identities) to be activated for receiving PDSCH (Physical Downlink Shared Channel), wherein format of the first MAC-CE depends on amount of the plurality of TCI state IDs. The method further includes the UE activating a plurality of TCI states associated with the plurality of TCI state IDs included or indicated in the first MAC-CE for receiving the PDSCH in response to reception of the first MAC-CE.

DETAILED DESCRIPTION

The exemplary wireless communication systems and devices described below employ a wireless communication system, supporting a broadcast service. Wireless communication systems are widely deployed to provide various types of communication such as voice, data, and so on. These systems may be based on code division multiple access (CDMA), time division multiple access (TDMA), orthogonal frequency division multiple access (OFDMA), 3GPP LTE (Long Term Evolution) wireless access, 3GPP LTE-A or LTE-Advanced (Long Term Evolution Advanced), 3GPP2 UMB (Ultra Mobile Broadband), WiMax, 3GPP NR (New Radio), or some other modulation techniques.

In particular, the exemplary wireless communication systems devices described below may be designed to support one or more standards such as the standard offered by a consortium named "3rd Generation Partnership Project" referred to herein as 3GPP, including: R2-162366, "Beam Forming Impacts", Nokia, Alcatel-Lucent; R2-163716, "Discussion on terminology of beamforming based high frequency NR", Samsung; R2-162709, "Beam support in NR", Intel; R2-162762, "Active Mode Mobility in NR: SINR drops in higher frequencies", Ericsson; 3GPP RAN2 #94 meeting minute; TR 38.912 V15.0.0 (2018-06), "Study on New Radio (NR) access technology (Release 15)"; TS 38.213 V15.3.0 (2018-09), "Physical layer procedures for control (Release 15)"; RP-181453, "WI Proposal on NR MIMO Enhancements"; TS 38.321 V15.3.0 (2018-09), "Medium Access Control (MAC) protocol specification (Release 15)"; TS 36.331 V15.3.0 (2018-09), "Radio Resource (RRC) protocol specification (Release 15)"; and R2-163879, "RAN2 Impacts in HF-NR", MediaTek. The standards and documents listed above are hereby expressly incorporated by reference in their entirety.

Figure 1:
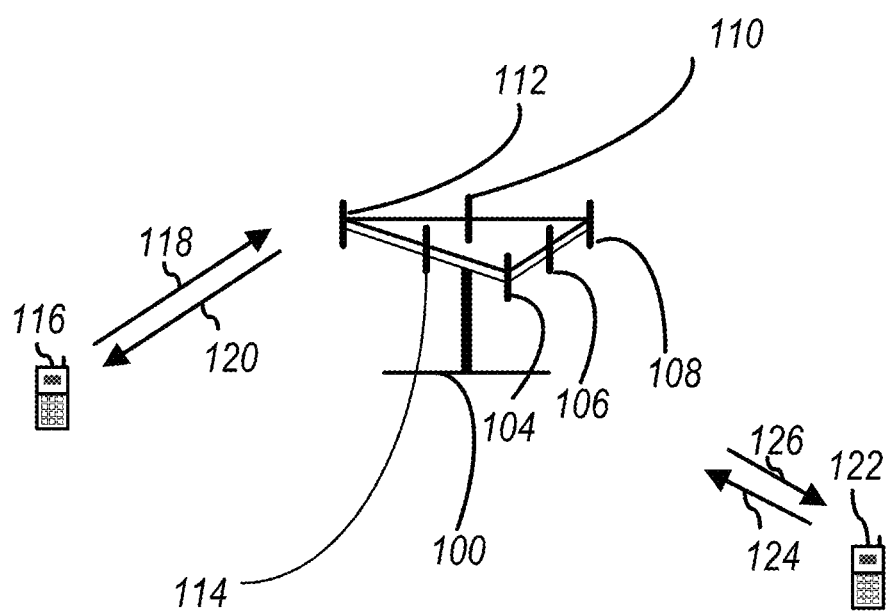
FIG. 1 shows a diagram of a wireless communication system according to one exemplary embodiment.

FIG. 1 shows a multiple access wireless communication system according to one embodiment of the invention. An access network 100 (AN) includes multiple antenna groups, one including 104 and 106, another including 108 and 110, and an additional including 112 and 114. In FIG. 1, only two antennas are shown for each antenna group, however, more or fewer antennas may be utilized for each antenna group. Access terminal 116 (AT) is in communication with antennas 112 and 114, where antennas 112 and 114 transmit information to access terminal 116 over forward link 120 and receive information from access terminal 116 over reverse link 118. Access terminal (AT) 122 is in communication with antennas 106 and 108, where antennas 106 and 108 transmit information to access terminal (AT) 122 over forward link 126 and receive information from access terminal (AT) 122 over reverse link 124. In a FDD system, communication links 118, 120, 124 and 126 may use different frequency for communication. For example, forward link 120 may use a different frequency then that used by reverse link 118.

Each group of antennas and/or the area in which they are designed to communicate is often referred to as a sector of the access network. In the embodiment, antenna groups each are designed to communicate to access terminals in a sector of the areas covered by access network 100.

In communication over forward links 120 and 126, the transmitting antennas of access network 100 may utilize beamforming in order to improve the signal-to-noise ratio of forward links for the different access terminals 116 and 122. Also, an access network using beamforming to transmit to access terminals scattered randomly through its coverage causes less interference to access terminals in neighboring cells than an access network transmitting through a single antenna to all its access terminals.

An access network (AN) may be a fixed station or base station used for communicating with the terminals and may also be referred to as an access point, a Node B, a base station, an enhanced base station, an evolved Node B (eNB), gNodeB (gNB), a network, a network node, or some other terminology. An access terminal (AT) may also be called user equipment (UE), a wireless communication device, terminal, access terminal or some other terminology.

Figure 2:
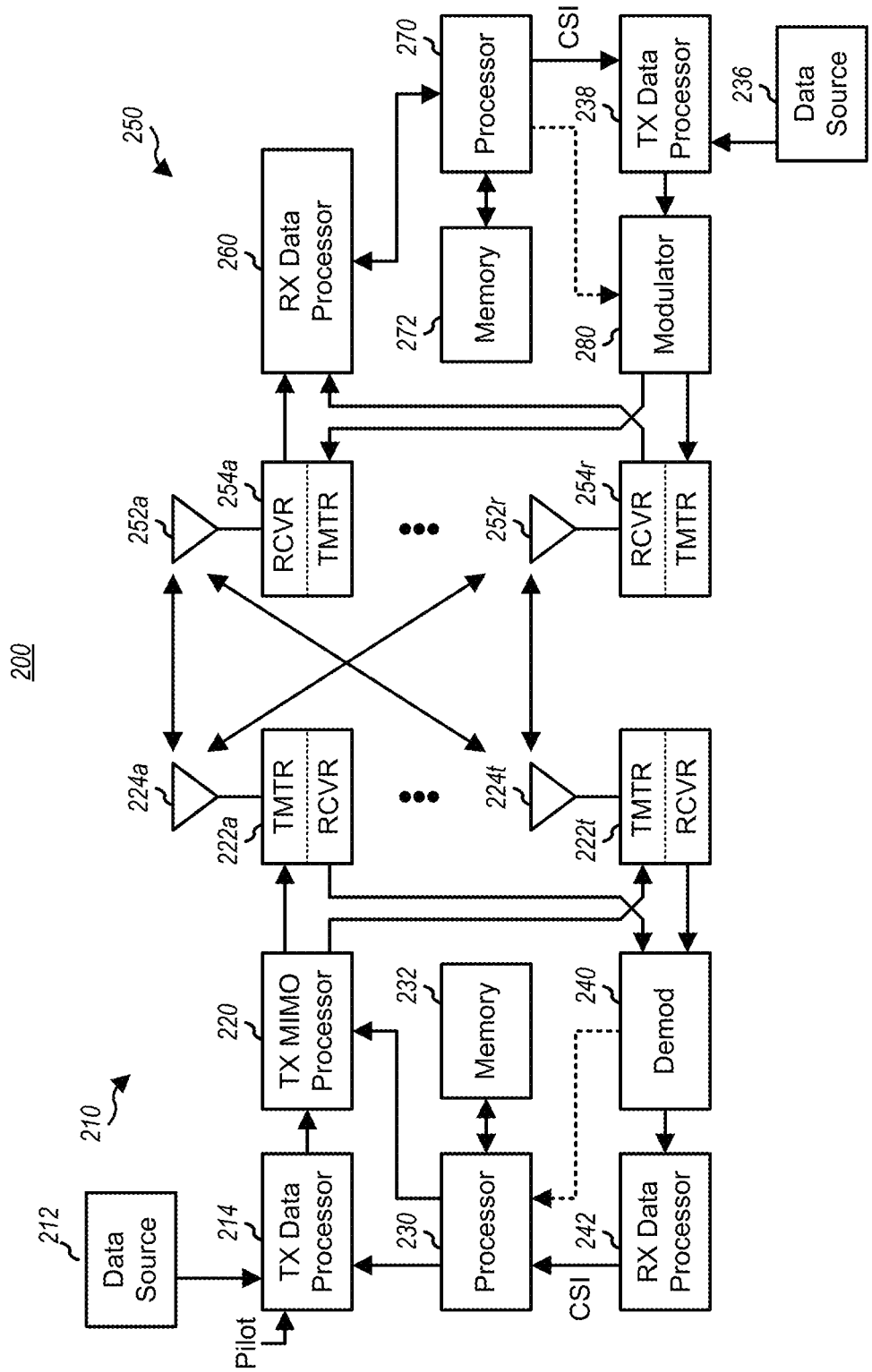
FIG. 2 is a block diagram of a transmitter system (also known as access network) and a receiver system (also known as user equipment or UE) according to one exemplary embodiment.

FIG. 2 is a simplified block diagram of an embodiment of a transmitter system 210 (also known as the access network) and a receiver system 250 (also known as access terminal (AT) or user equipment (UE)) in a MIMO system 200. At the transmitter system 210, traffic data for a number of data streams is provided from a data source 212 to a transmit (TX) data processor 214.

In one embodiment, each data stream is transmitted over a respective transmit antenna. TX data processor 214 formats, codes, and interleaves the traffic data for each data stream based on a particular coding scheme selected for that data stream to provide coded data.

The coded data for each data stream may be multiplexed with pilot data using OFDM techniques. The pilot data is typically a known data pattern that is processed in a known manner and may be used at the receiver system to estimate the channel response. The multiplexed pilot and coded data for each data stream is then modulated (i.e., symbol mapped) based on a particular modulation scheme (e.g., BPSK, QPSK, M-PSK, or M-QAM) selected for that data stream to provide modulation symbols. The data rate, coding, and modulation for each data stream may be determined by instructions performed by processor 230.

The modulation symbols for all data streams are then provided to a TX MIMO processor 220, which may further process the modulation symbols (e.g., for OFDM). TX MIMO processor 220 then provides $N_T$ modulation symbol streams to $N_T$ transmitters (TMTR) 222a through 222t. In certain embodiments, TX MIMO processor 220 applies beamforming weights to the symbols of the data streams and to the antenna from which the symbol is being transmitted.

Each transmitter 222 receives and processes a respective symbol stream to provide one or more analog signals, and further conditions (e.g., amplifies, filters, and upconverts) the analog signals to provide a modulated signal suitable for transmission over the MIMO channel. $N_T$ modulated signals from transmitters 222a through 222t are then transmitted from $N_T$ antennas 224a through 224t, respectively.

At receiver system 250, the transmitted modulated signals are received by $N_R$ antennas 252a through 252r and the received signal from each antenna 252 is provided to a respective receiver (RCVR) 254a through 254r. Each receiver 254 conditions (e.g., filters, amplifies, and downconverts) a respective received signal, digitizes the conditioned signal to provide samples, and further processes the samples to provide a corresponding "received" symbol stream.

An RX data processor 260 then receives and processes the $N_R$ received symbol streams from $N_R$ receivers 254 based on a particular receiver processing technique to provide $N_T$ "detected" symbol streams. The RX data processor 260 then demodulates, deinterleaves, and decodes each detected symbol stream to recover the traffic data for the data stream. The processing by RX data processor 260 is complementary to that performed by TX MIMO processor 220 and TX data processor 214 at transmitter system 210.

A processor 270 periodically determines which pre-coding matrix to use (discussed below). Processor 270 formulates a reverse link message comprising a matrix index portion and a rank value portion.

The reverse link message may comprise various types of information regarding the communication link and/or the received data stream. The reverse link message is then processed by a TX data processor 238, which also receives traffic data for a number of data streams from a data source 236, modulated by a modulator 280, conditioned by transmitters 254a through 254r, and transmitted back to transmitter system 210.

At transmitter system 210, the modulated signals from receiver system 250 are received by antennas 224, conditioned by receivers 222, demodulated by a demodulator 240, and processed by a RX data processor 242 to extract the reserve link message transmitted by the receiver system 250. Processor 230 then determines which pre-coding matrix to use for determining the beamforming weights then processes the extracted message.

Figure 3:
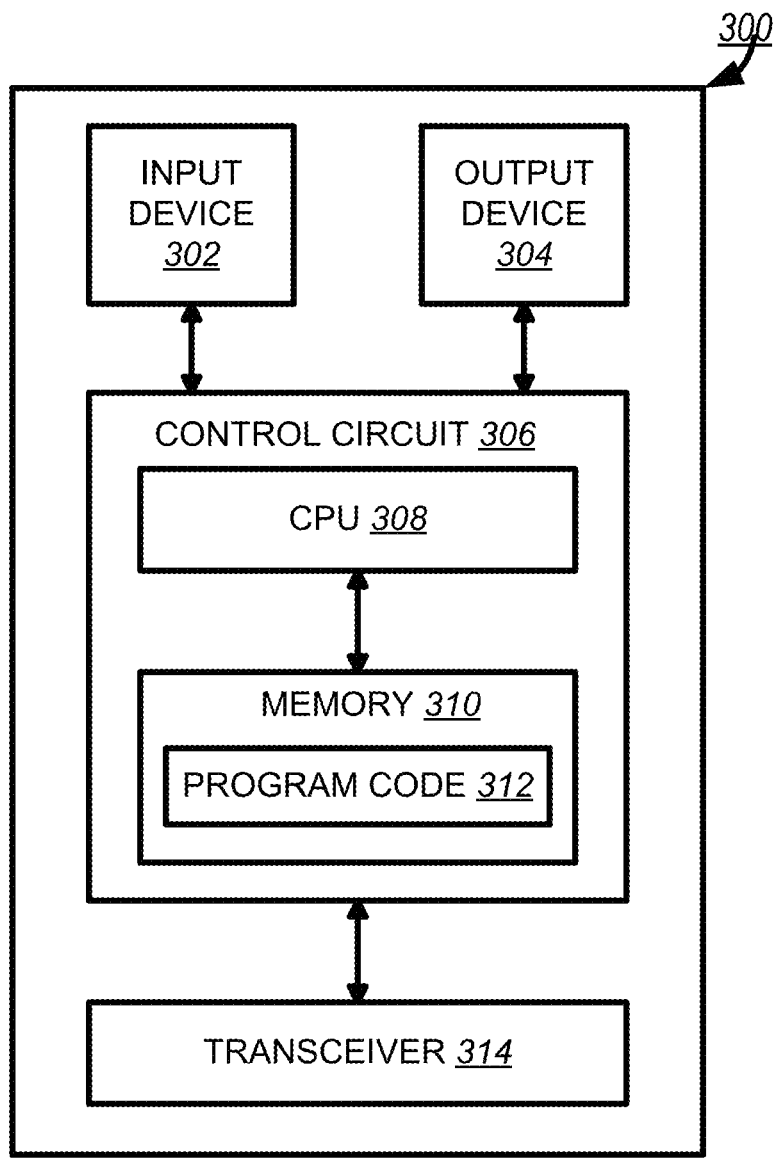
FIG. 3 is a functional block diagram of a communication system according to one exemplary embodiment.

Turning to FIG. 3, this figure shows an alternative simplified functional block diagram of a communication device according to one embodiment of the invention. As shown in FIG. 3, the communication device 300 in a wireless communication system can be utilized for realizing the UEs (or ATs) 116 and 122 in FIG. 1 or the base station (or AN) 100 in FIG. 1, and the wireless communications system is preferably the NR system. The communication device 300 may include an input device 302, an output device 304, a control circuit 306, a central processing unit (CPU) 308, a memory 310, a program code 312, and a transceiver 314. The control circuit 306 executes the program code 312 in the memory 310 through the CPU 308, thereby controlling an operation of the communications device 300. The communications device 300 can receive signals input by a user through the input device 302, such as a keyboard or keypad, and can output images and sounds through the output device 304, such as a monitor or speakers. The transceiver 314 is used to receive and transmit wireless signals, delivering received signals to the control circuit 306, and outputting signals generated by the control circuit 306 wirelessly. The communication device 300 in a wireless communication system can also be utilized for realizing the AN 100 in FIG. 1.

Figure 4:
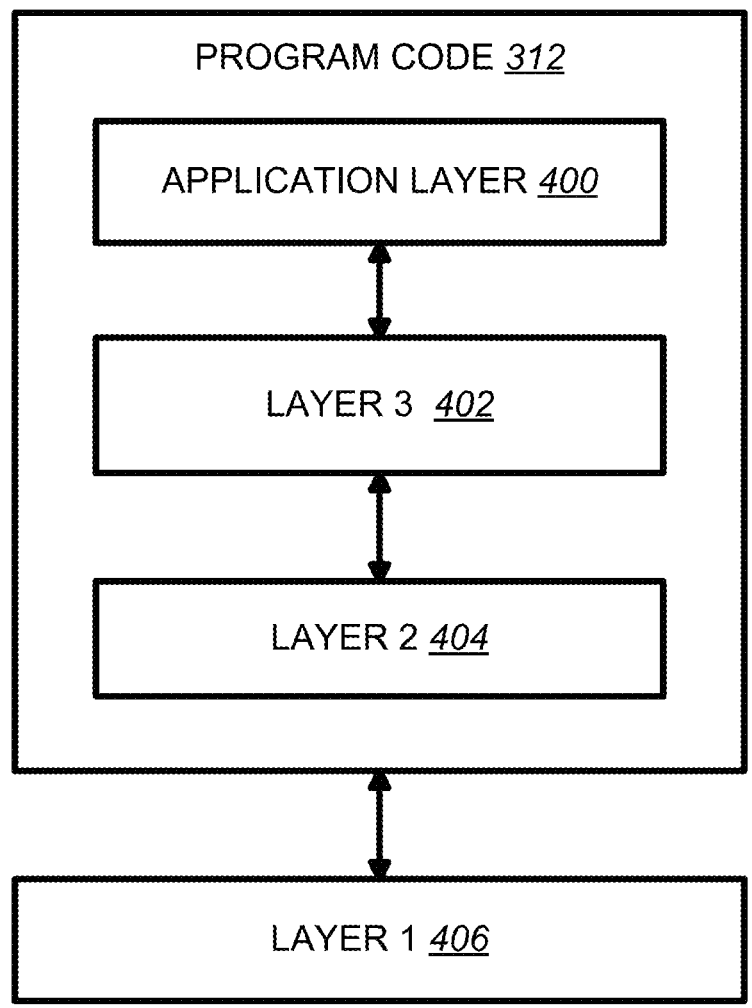
FIG. 4 is a functional block diagram of the program code of FIG. 3 according to one exemplary embodiment.

FIG. 4 is a simplified block diagram of the program code 312 shown in FIG. 3 in accordance with one embodiment of the invention. In this embodiment, the program code 312 includes an application layer 400, a Layer 3 portion 402, and a Layer 2 portion 404, and is coupled to a Layer 1 portion 406. The Layer 3 portion 402 generally performs radio resource control. The Layer 2 portion 404 generally performs link control. The Layer 1 portion 406 generally performs physical connections.

3GPP standardization activities on next generation (i.e. 5G) access technology have been launched since March 2015. In general, the next generation access technology aims to support the following three families of usage scenarios for satisfying both the urgent market needs and the more long-term requirements set forth by the ITU-R IMT-2020:
 eMBB (enhanced Mobile Broadband)
 mMTC (massive Machine Type Communications)
 URLLC (Ultra-Reliable and Low Latency Communications).

An objective of the 5G study item on new radio access technology is to identify and develop technology components needed for new radio systems which should be able to use any spectrum band ranging at least up to 100 GHz. Supporting carrier frequencies up to 100 GHz brings a number of challenges in the area of radio propagation. As the carrier frequency increases, the path loss also increases.

As discussed in 3GPP R2-162366, in lower frequency bands (e.g. current LTE bands<6 GHz) the required cell coverage may be provided by forming a wide sector beam for transmitting downlink common channels. However, utilizing wide sector beam on higher frequencies (>>6 GHz) the cell coverage is reduced with same antenna gain. Thus, in order to provide required cell coverage on higher frequency bands, higher antenna gain is needed to compensate the increased path loss. To increase the antenna gain over a wide sector beam, larger antenna arrays (number of antenna elements ranging from tens to hundreds) are used to form high gain beams.

As a consequence the high gain beams are narrow compared to a wide sector beam so multiple beams for transmitting downlink common channels are needed to cover the required cell area. The number of concurrent high gain beams that access point is able to form may be limited by the cost and complexity of the utilized transceiver architecture. In practice, on higher frequencies, the number of concurrent high gain beams is much less than the total number of beams required to cover the cell area. In other words, the access point is able to cover only part of the cell area by using a subset of beams at any given time.

Based on 3GPP R2-163716, beamforming is a signal processing technique used in antenna arrays for directional signal transmission or reception. With beamforming, a beam can be formed by combining elements in a phased array of antennas in such a way that signals at particular angles experience constructive interference while others experience destructive interference. Different beams can be utilized simultaneously using multiple arrays of antennas.

Figure 5:
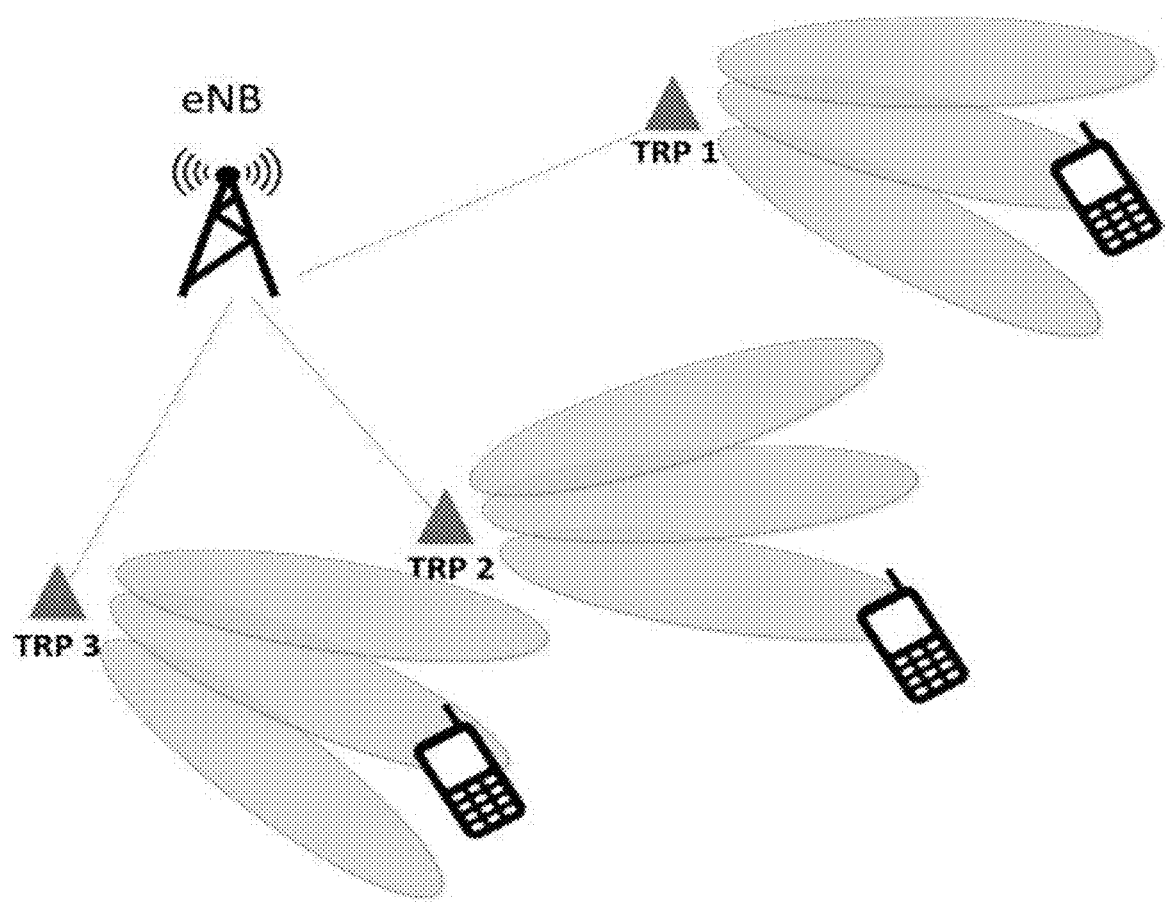
FIG. 5 is a reproduction of FIG. 1 of 3GPP R2-162709.

Based on 3GPP R2-162709 and as shown in FIG. 5, an eNB may have multiple TRPs (either centralized or distributed). Each TRP (Transmission/Reception Point) can form multiple beams. The number of beams and the number of simultaneous beams in the time/frequency domain depend on the number of antenna array elements and the RF (Radio Frequency) at the TRP.

Potential mobility type for NR (New RAT/Radio) can be listed as follows:
 Intra-TRP mobility
 Inter-TRP mobility
 Inter-NR eNB mobility As discussed in 3GPP R2-162709, reliability of a system purely relying on beamforming and operating in higher frequencies might be challenging, since the coverage might be more sensitive to both time and space variations. As a consequence, the SINR (Signal to Noise and Interference Ratio) of the narrow link can drop much quicker than in the case of LTE.

Using antenna arrays at access nodes with the number of elements in the hundreds, fairly regular grid-of-beams coverage patterns with tens or hundreds of candidate beams per node may be created. The coverage area of an individual beam from such array may be small, down to the order of some tens of meters in width. As a consequence, channel quality degradation outside the current serving beam area is quicker than in the case of wide area coverage, as provided by LTE.

Based on 3GPP RAN2 #94 meeting minutes, 1 NR eNB corresponds to 1 or many TRPs. Two levels of network controlled mobility:
 RRC driven at "cell" level.
 Zero/Minimum RRC involvement (e.g. at MAC/PHY)

Figure 6:
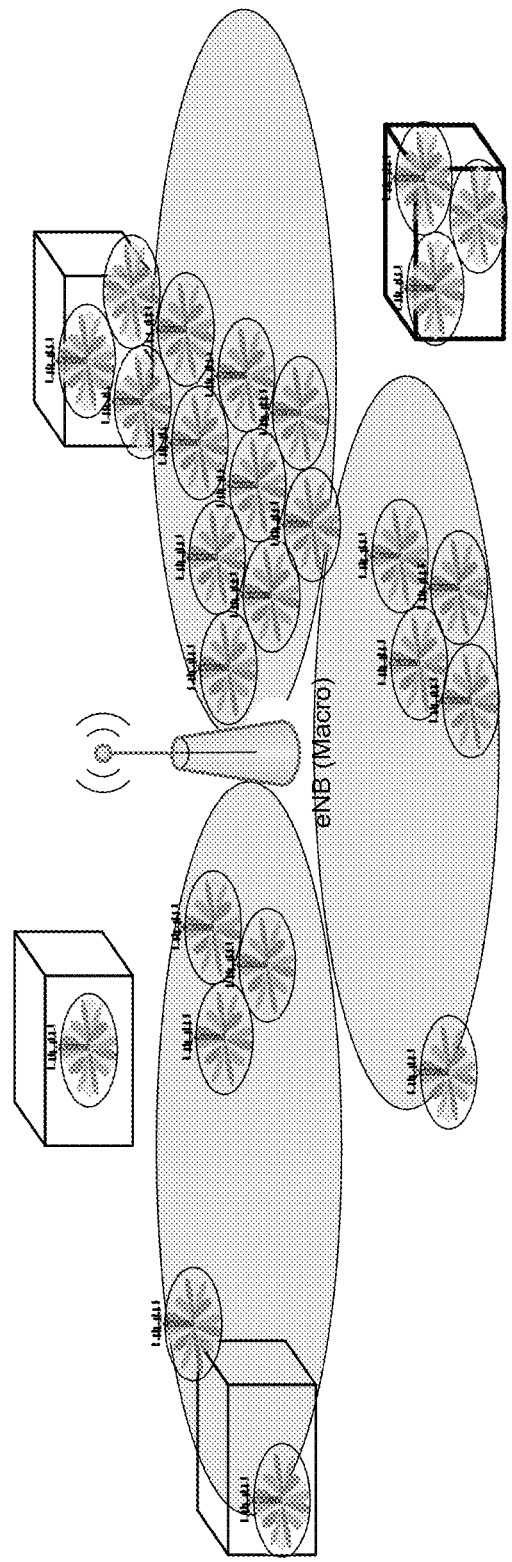
FIGS. 6 and 7 are reproduction of figures of R2-163879.
Figure 7:
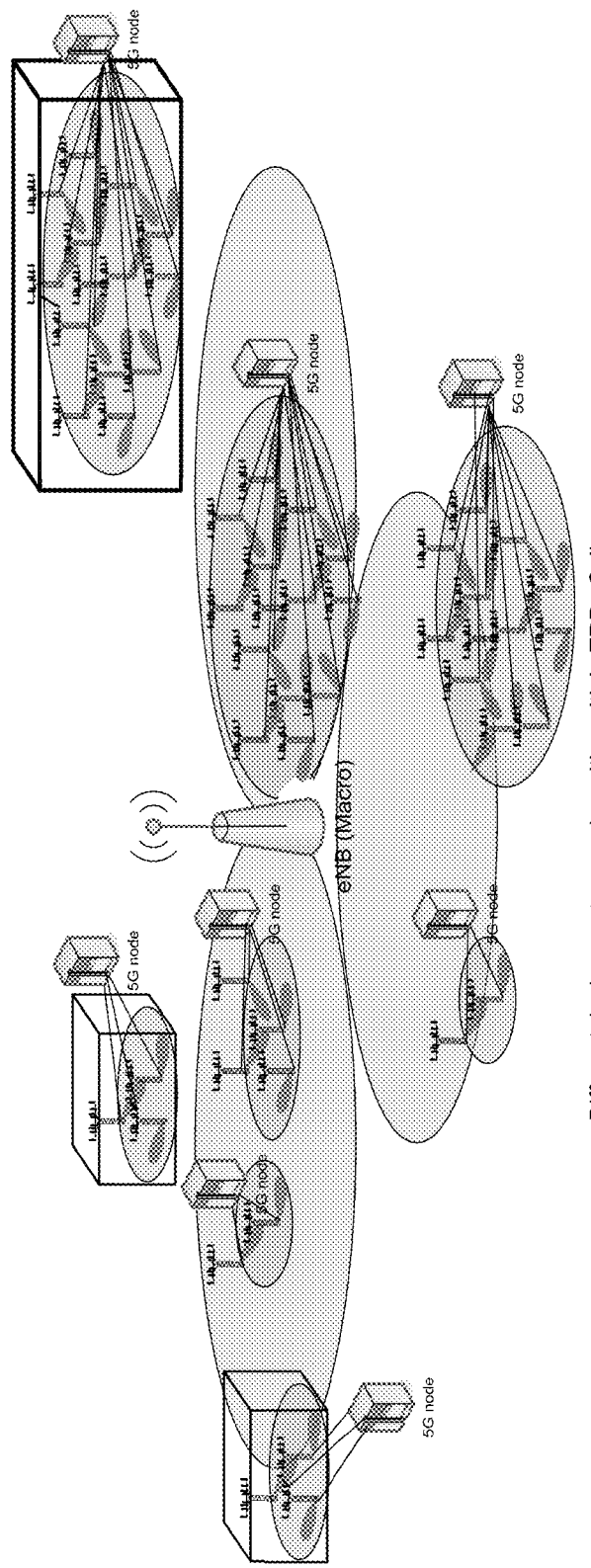

FIGS. 6 and 7 show some examples of the concept of a cell in 5G NR. FIG. 6 is a reproduction of a portion of FIG. 1 of 3GPP R2-163879, and shows exemplary different deployment scenarios with single TRP cell. FIG. 7 is a reproduction of a portion of FIG. 1 of 3GPP R2-163879, and shows exemplary different deployment scenarios with multiple TRP cells.

In 3GPP TR 38.912, the concepts or mechanisms of multi-antenna scheme (including beam management, MIMO (Multiple Input Multiple Output) schemes, CSI (Channel State Information) measurement and reporting, reference signal related to multi-antenna scheme, and Quasi-colocation (QCL)) are described as follows:

8.2.1.6 Multi-Antenna Scheme
8.2.1.6.1 Beam Management

In NR, beam management is defined as follows:
 Beam management: a set of L1/L2 procedures to acquire and maintain a set of TRxP(s) and/or UE beams that can be used for DL and UL transmission/reception, which include at least following aspects:
 Beam determination: for TRxP(s) or UE to select of its own Tx/Rx beam(s).
 Beam measurement: for TRxP(s) or UE to measure characteristics of received beamformed signals
 Beam reporting: for UE to report information of beamformed signal(s) based on beam measurement
 Beam sweeping: operation of covering a spatial area, with beams transmitted and/or received during a time interval in a predetermined way.

Also, the followings are defined as Tx/Rx beam correspondence at TRxP and UE:
 Tx/Rx beam correspondence at TRxP holds if at least one of the following is satisfied:
  TRxP is able to determine a TRxP Rx beam for the uplink reception based on UE's downlink measurement on TRxP's one or more Tx beams.

TRxP is able to determine a TRxP Tx beam for the downlink transmission based on TRxP's uplink measurement on TRxP's one or more Rx beams Tx/Rx beam correspondence at UE holds if at least one of the following is satisfied:
  UE is able to determine a UE Tx beam for the uplink transmission based on UE's downlink measurement on UE's one or more Rx beams.
  UE is able to determine a UE Rx beam for the downlink reception based on TRxP's indication based on uplink measurement on UE's one or more Tx beams.
  Capability indication of UE beam correspondence related information to TRxP is supported.

Note that definition/terminology of Tx/Rx beam correspondence is for convenience of discussion. The detailed performance conditions are up to RAN4.

The following DL L1/L2 beam management procedures are supported within one or multiple TRxPs:
  P-1: is used to enable UE measurement on different TRxP Tx beams to support selection of TRxP Tx beams/UE Rx beam(s)
    For beamforming at TRxP, it typically includes a intra/inter-TRxP Tx beam sweep from a set of different beams. For beamforming at UE, it typically includes a UE Rx beam sweep from a set of different beams.
  P-2: is used to enable UE measurement on different TRxP Tx beams to possibly change inter/intra-TRxP Tx beam(s)
    From a possibly smaller set of beams for beam refinement than in P-1. Note that P-2 can be a special case of P-1.
  P-3: is used to enable UE measurement on the same TRxP Tx beam to change UE Rx beam in the case UE uses beamforming At least network triggered aperiodic beam reporting is supported under P-1, P-2, and P-3 related operations.

UE measurement based on RS for beam management (at least CSI-RS) is composed of K (=total number of configured beams) beams, and UE reports measurement results of N selected Tx beams, where N is not necessarily fixed number. Note that the procedure based on RS for mobility purpose is not precluded. Reporting information at least include measurement quantities for N beam (s) and information indicating N DL Tx beam(s), if N<K. Specifically, when a UE is configured with K">1 non-zero power (NZP) CSI-RS resources, a UE can report N'CRIs (CSI-RS Resource Indicator).

A UE can be configured with the following high layer parameters for beam management:
  N≥1 reporting settings, M≥1 resource settings
    The links between reporting settings and resource settings are configured in the agreed CSI measurement setting
    CSI-RS based P-1 & P-2 are supported with resource and reporting settings
    P-3 can be supported with or without reporting setting
  A reporting setting at least including
    Information indicating selected beam(s)
    L1 measurement reporting
    Time-domain behavior: e.g. aperiodic, periodic, semi-persistent
    Frequency-granularity if multiple frequency granularities are supported
  A resource setting at least including
    Time-domain behavior: e.g. aperiodic, periodic, semi-persistent
    RS type: NZP CSI-RS at least
    At least one CSI-RS resource set, with each CSI-RS resource set having K≥1 CSI-RS resources
      Some parameters of K CSI-RS resources can be the same, e.g. port number, time-domain behavior, density and periodicity if any At least one of these two alternatives of beam reporting is supported.
  Alt 1:
    UE reports information about TRxP Tx Beam(s) that can be received using selected UE Rx beam set(s) where a Rx beam set refers to a set of UE Rx beams that are used for receiving a DL signal. Note that it is UE implementation issues on how to construct the Rx beam set. One example is that each of Rx beam in a UE Rx beam set corresponds to a selected Rx beam in each panel. For UEs with more than one UE Rx beam sets, the UE can report TRxP Tx Beam(s) and an identifier of the associated UE Rx beam set per reported TX beam(s).
      NOTE: Different TRxP Tx beams reported for the same Rx beam set can be received simultaneously at the UE.
      NOTE: Different TRxP TX beams reported for different UE Rx beam set may not be possible to be received simultaneously at the UE
  Alt 2:
    UE reports information about TRxP Tx Beam(s) per UE antenna group basis where UE antenna group refers to receive UE antenna panel or subarray. For UEs with more than one UE antenna group, the UE can report TRxP Tx Beam(s) and an identifier of the associated UE antenna group per reported TX beam.
      NOTE: Different TX beams reported for different antenna groups can be received simultaneously at the UE.
      NOTE: Different TX beams reported for the same UE antenna group may not be possible to be received simultaneously at the UE NR also supports the following beam reporting considering L groups where L>=1 and each group refers to a Rx beam set (Alt1) or a UE antenna group (Alt2) depending on which alternative is adopted. For each group I, UE reports at least the following information:
  Information indicating group at least for some cases
  Measurement quantities for $N_I$ beam (s)
    Support L1 RSRP and CSI report (when CSI-RS is for CSI acquisition)
  Information indicating $N_I$ DL Tx beam(s) when applicable
  This group based beam reporting is configurable per UE basis. This group based beam reporting can be turned off per UE basis e.g., when L=1 or $N_I$=1. Note that no group identifier is reported when it is turned off.

NR supports that UE can trigger mechanism to recover from beam failure. Beam failure event occurs when the quality of beam pair link(s) of an associated control channel falls low enough (e.g. comparison with a threshold, time-out of an associated timer). Mechanism to recover from beam failure is triggered when beam failure occurs. Note that here the beam pair link is used for convenience, and may or may not be used in specification. Network explicitly configures to UE with resources for UL transmission of signals for recovery purpose. Configurations of resources are supported where the base station is listening from all or partial directions, e.g., random access region. The UL transmission/resources to report beam failure can be located in the same time instance as PRACH (resources orthogonal to PRACH resources) or at a time instance (configurable for a UE)

different from PRACH. Transmission of DL signal is supported for allowing the UE to monitor the beams for identifying new potential beams.

NR supports beam management with and without beam-related indication. When beam-related indication is provided, information pertaining to UE-side beamforming/receiving procedure used for CSI-RS-based measurement can be indicated through QCL to UE. NR supports using the same or different beams on control channel and the corresponding data channel transmissions.

For NR-PDCCH transmission supporting robustness against beam pair link blocking, UE can be configured to monitor NR-PDCCH on M beam pair links simultaneously, where M≥1 and the maximum value of M may depend at least on UE capability. UE can be configured to monitor NR-PDCCH on different beam pair link(s) in different NR-PDCCH OFDM symbols. Parameters related to UE Rx beam setting for monitoring NR-PDCCH on multiple beam pair links are configured by higher layer signaling or MAC CE and/or considered in the search space design. At least, NR supports indication of spatial QCL assumption between an DL RS antenna port(s), and DL RS antenna port(s) for demodulation of DL control channel. Candidate signaling methods for beam indication for a NR-PDCCH (i.e. configuration method to monitor NR-PDCCH) are MAC CE signaling, RRC signaling, DCI signaling, specification-transparent and/or implicit method, and combination of these signaling methods. Note that indication may not be needed for some cases.

For reception of unicast DL data channel, NR supports indication of spatial QCL assumption between DL RS antenna port(s) and DM-RS antenna port(s) of DL data channel. Information indicating the RS antenna port(s) is indicated via DCI (downlink grants). The information indicates the RS antenna port(s) which is QCL-ed with DM-RS antenna port(s). Different set of DM-RS antenna port(s) for the DL data channel can be indicated as QCL with different set of RS antenna port(s). Note that indication may not be needed for some cases.

8.2.1.6.5 Quasi-Colocation (QCL)

Definition of QCL is that two antenna ports are said to be quasi co-located if properties of the channel over which a symbol on one antenna port is conveyed can be inferred from the channel over which a symbol on the other antenna port is conveyed. QCL supports the following functionalities at least Beam management functionality: at least including spatial parameters Frequency/timing offset estimation functionality: at least including Doppler/delay parameters RRM management functionality: at least including average gain For DM-RS antenna ports, NR supports:

All ports are quasi-collocated.

Not all ports are quasi-collocated.

DM-RS ports grouping is supported, and DM-RS ports within one group are QCL-ed, and DM-RS ports in different groups are non-QCLed. NR supports with and without a downlink indication to derive QCL assumption for assisting UE-side beamforming for downlink control channel reception.

For CSI-RS antenna ports,

Indication of QCL between the antenna ports of two CSI-RS resources is supported.

By default, no QCL should be assumed between antenna ports of two CSI-RS resources.

Partial QCL parameters (e.g., only spatial QCL parameter at UE side) should be considered.

For downlink, NR supports CSI-RS reception with and without beam-related indication, When beam-related indication is provided, information pertaining to UE-side beamforming/receiving procedure used for CSI-RS-based measurement can be indicated through QCL to UE QCL information includes spatial parameter(s) for UE side reception of CSI-RS ports Indication of QCL assumption associated with subset of QCL parameters between the antenna ports of two RS resources is supported.

By default (i.e., the UE is not indicated), antenna port(s) transmitted on different CCs can't be assumed to be quasi-collocated except for spatial domain QCL assumptions.

8.2.1.6.6 Network Coordination and Advanced Receiver

For coordinated transmission schemes for NR, both the case of co-located TRxPs and the case of non-co-located TRxPs are considered. For coordinated transmission schemes for NR, different types of coordinated transmission schemes for NR are supported. Both semi-static and dynamic network coordination schemes are considered. In supporting semi-static and dynamic network coordination schemes in NR, different coordination levels should be considered, e.g., centralized and distributed scheduling, the delay assumption used for coordination schemes, etc.

NR supports downlink transmission of the same NR-PDSCH data stream(s) from multiple TRxPs at least with ideal backhaul, and different NR-PDSCH data streams from multiple TRxPs with both ideal and non-ideal backhaul. Note that the case of supporting the same NR-PDSCH data stream(s) may or may not have spec impact.

In 3GPP TS 38.213, the concepts or mechanisms of UE procedure for receiving control information (e.g. PDCCH (Physical Downlink Control Channel)) are provided as follows:

10.1 UE Procedure for Determining Physical Downlink Control Channel Assignment

A set of PDCCH candidates for a UE to monitor is defined in terms of PDCCH search space sets. A search space set can be a common search space set or a UE-specific search space set. A UE monitors PDCCH candidates in one or more of the following search spaces sets a Type0-PDCCH common search space set configured by pdcch-ConfigSIB1 in MasterInformationBlock or by searchSpaceSIB1 in PDCCH-ConfigCommon or by searchSpaceZero in PDCCH-ConfigCommon for a DCI format with CRC scrambled by a SI-RNTI on the primary cell;

a Type0A-PDCCH common search space set configured by searchSpaceOtherSystemInformation in PDCCH-ConfigCommon for a DCI format with CRC scrambled by a SI-RNTI on the primary cell;

a Type1-PDCCH common search space set configured by ra-SearchSpace in PDCCH-ConfigCommon for a DCI format with CRC scrambled by a RA-RNTI or a TC-RNTI on the primary cell;

a Type2-PDCCH common search space set configured by pagingSearchSpace in PDCCH-ConfigCommon for a DCI format with CRC scrambled by a P-RNTI on the primary cell;

a Type3-PDCCH common search space set configured by SearchSpace in PDCCH-Config with searchSpaceType=common for DCI formats with CRC scrambled by INT-RNTI, SFI-RNTI, TPC-PUSCH- RNTI, TPC-PUCCH-RNTI, or TPC-SRS-RNTI and, only for the primary cell, C-RNTI, MCS-C-RNTI, or CS-RNTI(s); and a UE-specific search space set configured by SearchSpace in PDCCH-Config with searchSpaceType=ue-Specific for DCI formats with CRC scrambled by C-RNTI, MCS-C-RNTI, or CS-RNTI(s).

If a UE is not provided higher layer parameter searchSpace-SIB1 for Type0-PDCCH common search space set, the UE determines a control resource set and PDCCH monitoring occasions for Type0-PDCCH common search space set as described in Subclause 13. The Type0-PDCCH common search space set is defined by the CCE aggregation levels and the number of PDCCH candidates per CCE aggregation level given in Table 10.1-1. The control resource set configured for Type0-PDCCH common search space set has control resource set index 0. The Type0-PDCCH common search space set has search space set index 0.

If a UE is not provided a control resource set for Type0A-PDCCH common search space, the corresponding control resource set is same as the control resource set for Type0-PDCCH common search space. If the UE is not provided higher layer parameter searchSpaceOtherSystemInformation for Type0A-PDCCH common search space set, the Type0A-PDCCH common search space set is same as the Type0-PDCCH common search space set. The CCE aggregation levels and the number of PDCCH candidates per CCE aggregation level for Type0A-PDCCH common search space are given in Table 10.1-1.

For Type1-PDCCH common search space, a UE is provided a configuration for a search space by higher layer parameter ra-SearchSpace. If a UE is not provided by higher layers a control resource set for Type1-PDCCH common search space, the control resource set for Type1-PDCCH common search space is same as the control resource set for Type0-PDCCH common search space.

If a UE is not provided a control resource set for Type2-PDCCH common search space, the corresponding control resource set is same as the control resource set for Type0-PDCCH common search space. If a UE is not provided higher layer parameter pagingSearchSpace for Type2-PDCCH common search space set, the Type2-PDCCH common search space set is same as the Type0-PDCCH common search space set. The CCE aggregation levels and the number of PDCCH candidates per CCE aggregation level for Type2-PDCCH common search space are given in Table 10.1-1.

The UE may assume that the DM-RS antenna port associated with PDCCH receptions in the control resource set configured by pdcch-ConfigSIB1 in MasterInformationBlock and for corresponding PDSCH receptions, and the corresponding SS/PBCH block are quasi co-located with respect to average gain, QCL-TypeA, and QCL-TypeD properties, when applicable [6, TS 38.214]. The value for the DM-RS scrambling sequence initialization is the cell ID. A subcarrier spacing is provided by higher layer parameter subCarrierSpacingCommon in MasterInformationBlock.

For each DL BWP configured to a UE in a serving cell, a UE can be provided by higher layer signalling with P≤3 control resource sets. For each control resource set, the UE is provided the following by higher layer parameter ControlResourceSet:

a control resource set index p, 0≤p<12, by higher layer parameter controlResourceSetId;

a DM-RS scrambling sequence initialization value by higher layer parameter pdcch-DMRS-ScramblingID;

a precoder granularity for a number of REGs in the frequency domain where the UE can assume use of a same DM-RS precoder by higher layer parameter precoderGranularity;

a number of consecutive symbols provided by higher layer parameter duration;

a set of resource blocks provided by higher layer parameter frequencyDomainResources;

CCE-to-REG mapping parameters provided by higher layer parameter cce-REG-MappingType;

an antenna port quasi co-location, from a set of antenna port quasi co-locations provided by higher layer parameter TCI-States, indicating quasi co-location information of the DM-RS antenna port for PDCCH reception in a respective control resource set;

an indication for a presence or absence of a transmission configuration indication (TCI) field for DCI format 1_1 transmitted by a PDCCH in control resource set p, by higher layer parameter TCI-PresentInDCI.

When precoderGranularity=allContiguousRBs, a UE does not expect to be configured a set of resource blocks of a control resource set that includes more than four sub-sets of resource blocks that are not contiguous in frequency.

For each control resource set in a DL BWP of a serving cell, a respective higher layer parameter frequencyDomainResources provides a bitmap. The bits of the bitmap have a one-to-one mapping with non-overlapping groups of 6 consecutive PRBs, in ascending order of the PRB index in the DL BWP bandwidth of $N_{RB}^{BWP}$ PRBs with starting position $N_{BWP}^{start}$ where the first common RB of the first group of 6 PRBs has index $6 \cdot \lceil N_{BWP}^{start}/6 \rceil$. A group of 6 PRBs is allocated to a control resource set if a corresponding bit value in the bitmap is 1; else, if a corresponding bit value in the bitmap is 0, the group of 6 PRBs is not allocated to the control resource set.

If a UE has received initial configuration of more than one TCI states for PDCCH receptions by higher layer parameter TCI-States but has not received a MAC CE activation command for one of the TCI states, the UE assumes that the DM-RS antenna port associated with PDCCH receptions is quasi co-located with the SS/PBCH block the UE identified during the initial access procedure.

If the UE has received a MAC CE activation command for one of the TCI states, the UE applies the activation command 3 msec after a slot where the UE transmits HARQ-ACK information for the PDSCH providing the activation command.

If a UE has received higher layer parameter TCI-States for PDCCH receptions containing a single TCI state, the UE assumes that the DM-RS antenna port associated with PDCCH receptions is quasi co-located with the one or more DL RS configured by the TCI state.

3GPP introduced a work item for NR MIMO enhancement in 3GPP RP-181453 as follows:

3 Justification

The Rel-15 NR includes a number of MIMO features that facilitate utilization of a large number of antenna elements at base station for both sub-6 GHz and over-6 GHz frequency bands. Some of these features are primarily based on Rel-14 LTE while others are introduced due to several newly identified deployment scenarios such as multi-panel arrays, hybrid analog-digital for high frequency bands. In particular, the following MIMO features are included: limited support for multi-TRP/panel operation, flexible CSI acquisition and beam management, Type I (low-resolution) and II (high-resolution) codebooks supporting up to 32 ports, and flexible RS for MIMO transmission (especially CSI-RS, DMRS, and SRS). Equipped with such features, NR MIMO can differentiate itself from LTE MIMO at least in the following aspects. First, Type II codebook can offer substantial (at least 30%) gain in average user throughput over the best of Rel-14 LTE. Second, flexible CSI acquisition and RS design permit scalability for future enhancements. Third, NR MIMO accommodates operation in high frequency bands (>6 GHz) via beam management.

Overall, the Rel-15 MIMO features offer ample foundation for further potential enhancements which can be unlocked in Rel-16 NR. Such enhancements include the following. First, although Type II CSI specified in Rel-15 offers large gain over advanced CSI of Rel-14 LTE, there is still some significant, yet attainable, performance gap from near-ideal CSI especially for multi-user (MU)-MIMO. Second, although Rel-15 NR MIMO provisionally accommodates multi-TRP/panel operation, the supported features are limited to standard-transparent transmission operations and small number of TRPs/panels. Third, although specification support for multi-beam operation has been largely specified in Rel-15 (targeting over-6 GHz frequency band operation), some aspects such as beam failure recovery and enabling schemes for DL/UL beam selection are fairly basic and can potentially be improved for increased robustness, lower overhead, and/or lower latency. Fourth, there is a need for enhancement to allow full power transmission in case of uplink transmission with multiple power amplifiers.

4 Objective 4.1 Objective of SI or Core Part WI or Testing Part WI

The work item aims to specify the enhancements identified for NR MIMO. The detailed objectives are as follows.

Extend specification support in the following areas [RAN1]

Enhancements on MU-MIMO support:

Specify overhead reduction, based on Type II CSI feedback, taking into account the tradeoff between performance and overhead Perform study and, if needed, specify extension of Type II CSI feedback to rank>2

Enhancements on multi-TRP/panel transmission including improved reliability and robustness with both ideal and non-ideal backhaul:

Specify downlink control signalling enhancement(s) for efficient support of non-coherent joint transmission Perform study and, if needed, specify enhancements on uplink control signalling and/or reference signal(s) for non-coherent joint transmission Enhancements on multi-beam operation, primarily targeting FR2 operation:

Perform study and, if needed, specify enhancement(s) on UL and/or DL transmit beam selection specified in Rel-15 to reduce latency and overhead Specify UL transmit beam selection for multi-panel operation that facilitates panel-specific beam selection Specify a beam failure recovery for SCell based on the beam failure recovery specified in Rel-15

Specify measurement and reporting of either L1-RSRQ or L1-SINR

Perform study and make conclusion in the first RAN1 meeting after start of the WI, and if needed, specify CSI-RS and DMRS (both downlink and uplink) enhancement for PAPR reduction for one or multiple layers (no change on RE mapping specified in Rel-15)

Specify enhancement to allow full power transmission in case of uplink transmission with multiple power amplifiers (assume no change on UE power class)

Specify higher layer support of enhancements listed above [RAN2]

Specify core requirements associated with the items specified by RAN1 [RAN4]

In 3GPP TS 38.321, the description related to the indication of TCI state is provided as follows:

5.18.2 Activation/Deactivation of Semi-Persistent CSI-RS/CSI-IM Resource Set

The network may activate and deactivate the configured Semi-persistent CSI-RS/CSI-IM resource sets of a Serving Cell by sending the SP CSI-RS/CSI-IM Resource Set Activation/Deactivation MAC CE described in subclause 6.1.3.12. The configured Semi-persistent CSI-RS/CSI-IM resource sets are initially deactivated upon configuration and after a handover.

The MAC entity shall:

1> if the MAC entity receives an SP CSI-RS/CSI-IM Resource Set Activation/Deactivation MAC CE on a Serving Cell:

2> indicate to lower layers the information regarding the SP CSI-RS/CSI-IM Resource Set Activation/Deactivation MAC CE.

5.18.3 Aperiodic CSI Trigger State Subselection

The network may select among the configured aperiodic CSI trigger states of a Serving Cell by sending the Aperiodic CSI Trigger State Subselection MAC CE described in subclause 6.1.3.13.

The MAC entity shall:

1> if the MAC entity receives an Aperiodic CSI trigger State Subselection MAC CE on a Serving Cell:

2> indicate to lower layers the information regarding Aperiodic CSI trigger State Subselection MAC CE.

5.18.4 Activation/Deactivation of UE-Specific PDSCH TCI State

The network may activate and deactivate the configured TCI states for PDSCH of a Serving Cell by sending the TCI States Activation/Deactivation for UE-specific PDSCH MAC CE described in subclause 6.1.3.14. The configured TCI states for PDSCH are initially deactivated upon configuration and after a handover.

The MAC entity shall:

1> if the MAC entity receives an TCI States Activation/Deactivation for UE-specific PDSCH MAC CE on a Serving Cell:

2> indicate to lower layers the information regarding the TCI States Activation/Deactivation for UE-specific PDSCH MAC CE.

5.18.5 Indication of TCI State for UE-Specific PDCCH

The network may indicate a TCI state for PDCCH reception for a CORESET of a Serving Cell by sending the TCI State Indication for UE-specific PDCCH MAC CE described in subclause 6.1.3.15.

The MAC entity shall:

1> if the MAC entity receives a TCI State Indication for UE-specific PDCCH MAC CE on a Serving Cell:

2> indicate to lower layers the information regarding the TCI State Indication for UE-specific PDCCH MAC CE.

5.18.9 Activation/Deactivation of Semi-Persistent ZP CSI-RS Resource Set

The network may activate and deactivate the configured Semi-persistent ZP CSI-RS resource set of a Serving Cell by sending the SP ZP CSI-RS Resource Set Activation/Deactivation MAC CE described in subclause 6.1.3.19. The configured Semi-persistent ZP CSI-RS resource sets are initially deactivated upon configuration and after a handover.

The MAC entity shall:
1> if the MAC entity receives an SP ZP CSI-RS Resource Set Activation/Deactivation MAC CE on a Serving Cell:
2> indicate to lower layers the information regarding the SP ZP CSI-RS Resource Set Activation/Deactivation MAC CE.

6.1.3.12 SP CSI-RS/CSI-IM Resource Set Activation/Deactivation MAC CE

The SP CSI-RS/CSI-IM Resource Set Activation/Deactivation MAC CE is identified by a MAC PDU subheader with LCID as specified in Table 6.2.1-1. It has a variable size and consists of the following fields:

A/D: This field indicates whether the MAC CE is used to activate or deactivate indicated SP CSI-RS and CSI-IM resource set(s). The field is set to "1" to indicate activation, otherwise it indicates deactivation;

Serving Cell ID: This field indicates the identity of the Serving Cell for which the MAC CE applies. The length of the field is 5 bits;

BWP ID: This field contains BWP-Id, as specified in TS 38.331 [5], of a downlink bandwidth part for which the MAC CE applies. The length of the BWP ID field is 2 bits;

SP CSI-RS resource set ID: This field contains an index of NZP-CSI-RS-ResourceSet containing Semi Persistent NZP CSI-RS resources, as specified in TS 38.331 [5], indicating the Semi Persistent NZP CSI-RS resource set, which should be activated or deactivated. The length of the field is 6 bits;

IM: This field indicates whether SP CSI-IM resource set indicated with SP CSI-IM resource set ID field should be activated/deactivated. If IM field is set to "1", SP CSI-IM resource set should be activated or deactivated (depending on A/D field setting). If IM field is set to "0", the octet containing SP CSI-IM resource set ID field is not present;

SP CSI-IM resource set ID: This field contains an index of CSI-IM-ResourceSet containing Semi Persistent CSI-IM resources, as specified in TS 38.331 [5], indicating the Semi Persistent CSI-IM resource set, which should be activated or deactivated. The length of the field is 6 bits;

TCI State $ID_i$: This field contains TCI-StateId, as specified in TS 38.331 [5], of a TCI State, which is used as QCL source for the resource within the Semi Persistent NZP CSI-RS resource set indicated by SP CSI-RS resource set ID field. TCI State $ID_0$ indicates TCI State for the first resource within the set, TCI State $ID_1$ for the second one and so on. The length of the field is 7 bits. If A/D field is set to "0" then the octet containing this field is not present;

R: Reserved bit, set to "0".

6.1.3.13 Aperiodic CSI Trigger State Subselection MAC CE

The Aperiodic CSI Trigger State Subselection MAC CE is identified by a MAC PDU subheader with LCID as specified in Table 6.2.1-1. It has a variable size consisting of following fields:

Serving Cell ID: This field indicates the identity of the Serving Cell for which the MAC CE applies. The length of the field is 5 bits;

BWP ID: This field contains BWP-Id, as specified in TS 38.331 [5], of a downlink bandwidth part for which the MAC CE applies. The length of the BWP ID field is 2 bits;

$T_i$: This field indicates the selection status of the Aperiodic Trigger States configured within CSI-aperiodic-TriggerStateList, as specified in TS 38.331 [5]. To refers to the first trigger state within the list, $T_1$ to the second one and so on. If the list does not contain entry with index i, MAC entity shall ignore the $T_i$ field. The $T_i$ field is set to "1" to indicate that the Aperiodic Trigger State i shall be mapped to the codepoint of the DCI CSI request field, as specified in TS 38.214 [7]. The codepoint to which the Aperiodic Trigger State is mapped is determined by its ordinal position among all the Aperiodic Trigger States with $T_i$ field set to "1", i.e. the first Aperiodic Trigger State with $T_i$ field set to "1" shall be mapped to the codepoint value 1, second Aperiodic Trigger State with $T_i$ field set to "1" shall be mapped to the codepoint value 2 and so on. The maximum number of mapped Aperiodic Trigger States is 63;

R: Reserved bit, set to "0".

6.1.3.14 TCI States Activation/Deactivation for UE-Specific PDSCH MAC CE

The TCI States Activation/Deactivation for UE-specific PDSCH MAC CE is identified by a MAC PDU subheader with LCID as specified in Table 6.2.1-1. It has a variable size consisting of following fields:

Serving Cell ID: This field indicates the identity of the Serving Cell for which the MAC CE applies. The length of the field is 5 bits;

BWP ID: This field contains BWP-Id, as specified in TS 38.331 [5], of a downlink bandwidth part for which the MAC CE applies. The length of the BWP ID field is 2 bits;

$T_i$: If there is a TCI state with TCI-StateId i as specified in TS 38.331 [5], this field indicates the activation/deactivation status of the TCI state with TCI-StateId i, otherwise MAC entity shall ignore the $T_i$ field. The $T_i$ field is set to "1" to indicate that the TCI state with TCI-StateId i shall be activated and mapped to the codepoint of the DCI Transmission Configuration Indication field, as specified in TS 38.214 [7]. The $T_i$ field is set to "0" to indicate that the TCI state with TCI-StateId i shall be deactivated and is not mapped to the codepoint of the DCI Transmission Configuration Indication field. The codepoint to which the TCI State is mapped is determined by its ordinal position among all the TCI States with $T_i$ field set to "1", i.e. the first TCI State with $T_i$ field set to "1" shall be mapped to the codepoint value 0, second TCI State with $T_i$ field set to "1" shall be mapped to the codepoint value 1 and so on. The maximum number of activated TCI states is 8;

R: Reserved bit, set to "0".

6.1.3.15 TCI State Indication for UE-Specific PDCCH MAC CE

The TCI State Indication for UE-specific PDCCH MAC CE is identified by a MAC PDU subheader with LCID as specified in Table 6.2.1-1. It has a fixed size of 16 bits with following fields:

Serving Cell ID: This field indicates the identity of the Serving Cell for which the MAC CE applies. The length of the field is 5 bits;

CORESET ID: This field indicates a Control Resource Set identified with ControlResourceSetId as specified in TS 38.331 [5], for which the TCI State is being indicated. The length of the field is 4 bits;

TCI State ID: This field indicates the TCI state identified by TCI-StateId as specified in TS 38.331 [5] applicable to the Control Resource Set identified by CORESET ID field. The length of the field is 7 bits.

6.1.3.19 SP ZP CSI-RS Resource Set Activation/Deactivation MAC CE

The SP ZP CSI-RS Resource Set Activation/Deactivation MAC CE is identified by a MAC PDU subheader with LCID as specified in Table 6.2.1-1. It has a fixed size of 16 bits with following fields:

A/D: This field indicates whether the MAC CE is used to activate or deactivate indicated SP ZP CSI-RS resource set. The field is set to "1" to indicate activation, otherwise it indicates deactivation;

Serving Cell ID: This field indicates the identity of the Serving Cell for which the MAC CE applies. The length of the field is 5 bits;

BWP ID: This field contains BWP-Id, as specified in TS 38.331 [5], of a downlink bandwidth part for which the MAC CE applies. The length of the BWP ID field is 2 bits;

SP ZP CSI-RS resource set ID: This field contains an index of sp-ZP-CSI-RS-ResourceSetsToAddModList, as specified in TS 38.331 [5], indicating the Semi Persistent ZP CSI-RS resource set, which should be activated or deactivated. The length of the field is 4 bits;

R: Reserved bit, set to "0".

In 3GPP TS 38.331, the configurations or parameters associated with PDCCH, control resource set, (CORESET), search space, and TCI state are depicted as follows:

PDCCH-Config

The PDCCH-Config IE is used to configure UE specific PDCCH parameters such as control resource sets (CORESET), search spaces and additional parameters for acquiring the PDCCH.

PDCCH-Config Information Element

| PDCCH-Config field descriptions |
| --- |
| controlResourceSetToAddModList |
| List of UE specifically configured Control Resource Sets (CORESETs) to be used by the UE. The network configures at most 3 CORESETs per BWP per cell (including UE-specific and common CORESETs). |
| downlinkPreemption |
| Configuration of downlink preemption indications to be monitored in this cell. Corresponds to L1 parameter 'Preemp-DL' (see 38.214, section 11.2) FFS_RAN1: LS R1-1801281 indicates this is "Per Cell (but association with each configured BWP is needed)" => Unclear, keep on BWP for now. |
| searchSpacesToAddModList |
| List of UE specifically configured Search Spaces. The network configures at most 10 Search Spaces per BWP per cell (including UE-specific and common Search Spaces). [ . . . ] |

ControlResourceSet

The IE ControlResourceSet is used to configure a time/frequency control resource set (CORESET) in which to search for downlink control information (see 38.213, section FFS_Section).

```
-- ASN1START
-- TAG-PDCCH-CONFIG-START
PDCCH-Config ::=                    SEQUENCE {
    controlResourceSetToAddModList      SEQUENCE(SIZE (1..3)) OF
ControlResourceSet                      OPTIONAL,   -- Need N
    controlResourceSetToReleaseList     SEQUENCE(SIZE (1..3)) OF
ControlResourceSetId                    OPTIONAL,   -- Need N
    searchSpacesToAddModList            SEQUENCE(SIZE (1..10)) OF
SearchSpace                             OPTIONAL,   -- Need N
    searchSpacesToReleaseList           SEQUENCE(SIZE (1..10)) OF
SearchSpaceId                           OPTIONAL,   -- Need N
    downlinkPreemption                  SetupRelease {
DownlinkPreemption }                        OPTIONAL,   --
Need M
    tpc-PUSCH                           SetupRelease { PUSCH-TPC-
CommandConfig }                             OPTIONAL,   -- Need M
    tpc-PUCCH                           SetupRelease { PUCCH-TPC-
CommandConfig }                             OPTIONAL,   -- Cond PUCCH-
CellOnly
    tpc-SRS                             SetupRelease { SRS-TPC-
CommandConfig}                              OPTIONAL,   -- Need M
    ...
}
-- TAG-PDCCH-CONFIG-STOP
-- ASN1STOP
```

ControlResourceSet Information Element

```
-- ASN1START
-- TAG-CONTROLRESOURCESET-START
ControlResourceSet ::=                    SEQUENCE {
    controlResourceSetId                      ControlResourceSetId,
    frequencyDomainResources                  BIT STRING (SIZE (45)),
    duration                                  INTEGER
(1..maxCoReSetDuration),
    cce-REG-MappingType                       CHOICE {
        interleaved                               SEQUENCE {
            reg-BundleSize                            ENUMERATED {n2,
n3, n6},
            interleaverSize                           ENUMERATED {n2,
n3, n6},
            shiftIndex
INTEGER(0..maxNrofPhysicalResourceBlocks-1)
OPTIONAL   -- Need S
        },
        nonInterleaved                            NULL
    },
    precoderGranularity                       ENUMERATED {sameAsREG-
bundle, allContiguousRBs},
    tci-StatesPDCCH-ToAddList                 SEQUENCE (SIZE
(1..maxNrofTCI-StatesPDCCH)) OF TCI-StateId    OPTIONAL,
-- Need N
    tci-StatesPDCCH-ToReleaseList             SEQUENCE (SIZE
(1..maxNrofTCI-StatesPDCCH)) OF TCI-StateId    OPTIONAL,
-- Need N
    tci-PresentInDCI                          ENUMERATED {enabled}
OPTIONAL,   -- Need S
    pdcch-DMRS-ScramblingID                   INTEGER (0..65535)
OPTIONAL,   -- Need S
    ...
}
-- TAG-CONTROLRESOURCESET-STOP
-- ASN1STOP
```

| ControlResourceSet field descriptions |
|---|
| [ ... ] |
| controlResourceSetId |
| Corresponds to L1 parameter 'CORESET-ID'. Value 0 identifies the common CORESET configured in MIB and in ServingCellConfigCommon (controlResourceSetZero) and is hence not used here in the ControlResourceSet IE. Values 1 . . . maxNrofControlResourceSets-1 identify CORESETs configured by dedicated signalling or in SIB1. The controlResourceSetId is unique among the BWPs of a ServingCell. |
| [ ... ] |
| tci-PresentInDCI |
| If at least spatial QCL is configured/indicated, this field indicates if TCI field is present or not present in DL-related DCI. When the field is absent the UE considers the TCI to be absent/disabled. Corresponds to L1 parameter 'TCI-PresentInDCI' (see 38.214, section 5.1.5). |
| tci-StatesPDCCH-ToAddList, tci-StatesPDCCH-ToReleaseList |
| A subset of the TCI states defined in pdsch-Config. They are used for providing QCL relationships between the DL RS(s) in one RS Set (TCI-State) and the PDCCH DMRS ports. Corresponds to L1 parameter 'TCI-StatesPDCCH' (see 38.213, section10.). The network configures at most maxNrofTCI-StatesPDCCH entries. |

TCI-State

The IE TCI-State associates one or two DL reference signals with a corresponding quasi-colocation (QCL) type.

TCI-State Information Element

```
-- ASN1START
-- TAG-TCI-STATE-START
TCI-State ::=                             SEQUENCE {
    tci-StateId                               TCI-StateId,
    qcl-Type1                                 QCL-Info,
    qcl-Type2                                 QCL-Info
OPTIONAL,   -- Need R
    ...
}
QCL-Info ::=                              SEQUENCE {
    cell                                      ServCellIndex
OPTIONAL,   -- Need R
    bwp-Id                                    BWP-Id
OPTIONAL, -- Cond CSI-RS-Indicated
    referenceSignal                           CHOICE {
```

-continued

```
    csi-rs                      NZP-CSI-RS-ResourceId,
    ssb                         SSB-Index
  },
  qcl-Type                      ENUMERATED {typeA,
                                typeB,
typeC, typeD},
  ...
}
-- TAG-TCI-STATE-STOP
-- ASN1STOP
```

| QCL-Info field descriptions |
| --- |
| bwp-Id |
| The DL BWP which the RS is located in. |
| cell |
| The UE's serving cell in which the referenceSignal is configured. If the field is absent, it applies to the serving cell in which the TCI-State is configured. The RS can be located on a serving cell other than the serving cell in which the TCI-State is configured only if the qcl-Type is configured as typeD. See TS 38.214 section 5.1.5.<br>[ . . . ]<br>referenceSignal |
| Reference signal with which quasi-collocation information is provided as specified in TS 38.3214 subclause 5.1.5.<br>qcl-Type |
| QCL type as specified in TS 38.214 subclause 5.1.5. |

| Conditional Presence | Explanation |
| --- | --- |
| CSI-RS-Indicated | This field is mandatory present if csi-rs or csi-RS-for-tracking is included, absent otherwise |

TCI-StateId

The IE TCI-StateId is used to identify one TCI-State configuration.

TCI-StateId Information Element

```
-- ASN1START
-- TAG-TCI-STATEID-START
TCI-StateId ::=                 INTEGER (0..maxNrofTCI-States-1)
-- TAG-TCI-STATEID-STOP
-- ASN1STOP
```

One or multiple of following terminologies may be used hereafter:
  BS: A network central unit or a network node in NR which is used to control one or multiple TRPs which are associated with one or multiple cells. Communication between BS and TRP(s) is via fronthaul. BS could also be referred to as central unit (CU), eNB, gNB, or NodeB.
  TRP: A transmission and reception point provides network coverage and directly communicates with UEs. TRP could also be referred to as distributed unit (DU) or network node.
  Cell: A cell is composed of one or multiple associated TRPs, i.e. coverage of the cell is composed of coverage of all associated TRP(s). One cell is controlled by one BS. Cell could also be referred to as TRP group (TRPG).
  Serving beam: Serving beam for a UE is a beam (e.g. RX beam or TX beam) generated by a network node, e.g. TRP, which is currently used to communicate with the UE, e.g. for transmission and/or reception. One UE is possible to generate multiple UE beams concurrently and to be served by multiple serving beams from one or multiple TRPs of the same cell. Same or different (DL or UL) data could be transmitted on the same radio resource via different serving beams for diversity or throughput gain. Serving beam for a UE could be also a beam generated by a network node, e.g. TRP, which is configured to be used to communicate with the UE, e.g. for transmission and/or reception.

For the monitoring of Physical Downlink Control Channel (PDCCH), network could configure UE with a control resource set (CORESET) which may comprise time and/or frequency resources, and an associated search space in which UE searches for downlink control information/PDCCH candidates. In addition, the UE may be configured and/or indicated and/or activated with a specific beam (also referred to TCI (Transmission Configuration Indication) state, and/or SRI (Service Request Indicator) and/or spatial QCL (Quasi Co Location) assumption) corresponding to the CORESET for monitoring PDCCH.

According to 3GPP TS 38.331, the configuration of PDCCH (PDCCH-Config) may configure UE with a control resource set list (e.g. controlResourceSetToAddModList), and each control resource set (ControlResourceSet) may be configured with a TCI state list (tci-StatesPDCCH-ToAddList). If the TCI state list only comprises one TCI state, the UE may monitor the PDCCH via this TCI state. On the other hand, if the TCI stat list indicates more than one TCI state, the network may further indicate or activate a TCI state (of the configured TCI state list) for PDCCH reception for a CORESET of a Serving Cell by sending the TCI State Indication for UE-specific PDCCH MAC CE (as discussed in 3GPP TS 38.321). When the UE receives a TCI State Indication for UE-specific PDCCH MAC CE on a serving cell, the UE could use the TCI state indicated by this MAC CE to monitor the PDCCH on the associated CORESET of the serving cell.

Figure 12:
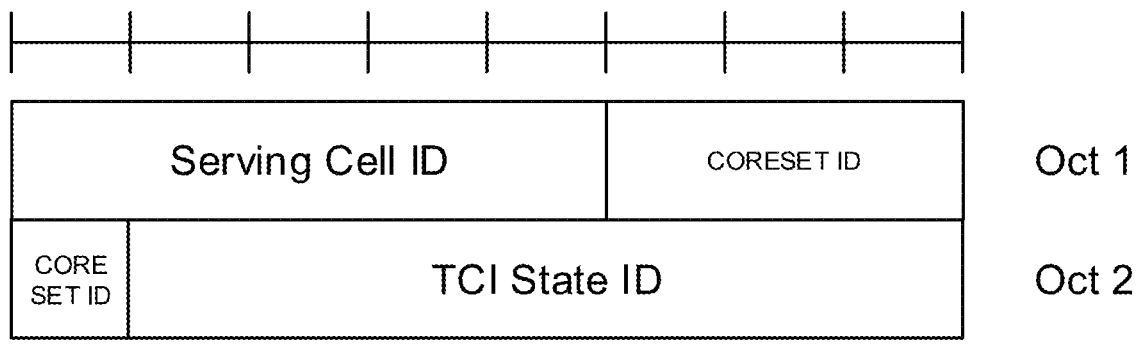
FIG. 12 is a reproduction of FIG. 6.1.3.15-1 of 3GPP TS 38.321 V15.3.0.

In 3GPP release 15, it is assumed that the UE could only monitor PDCCH on one CORESET via one beam (e.g. one TCI state and/or one spatial QCL assumption). In other words, the UE could not be activated with multiple beams for monitoring the PDCCH on the CORESET at the same time. Therefore, the TCI state indication for UE-specific PDCCH MAC CE merely includes one specific field for indicating one TCI state, which is shown in FIG. 12 (which is reproduction of FIG. 6.1.3.15-1 of 3GPP TS 38.321 V15.3.0). However, in future release, the UE may support to use multiple beams (e.g. more than one TCI states or spatial QCL assumptions) to monitor PDCCH on one CORESET at the same time. Current design for beam indication may be not enough. Furthermore, not only the beam indication for PDCCH, but also the beam indications for PDSCH (Physical Downlink Shared Channel), PUCCH (Physical Uplink Control Channel), PUSCH (Physical Uplink Shared Channel), SRS (Sounding Reference Signal), CSI-RS (Channel State Information-Reference Signal), CSI reporting, and/or beam failure recovery are needed to be taken into account as well. For example, the UE may need to receive PDSCH via more than one beam concurrently.

Thus, some enhancements, methods, and/or alternatives for multiple-beams indication for PDCCH, PDSCH, PUCCH, PUSCH, SRS, CSI-RS, CSI reporting, and/or beam failure recovery are described below. Any one or more than one of the following formats, features, and/or alternatives could be combined arbitrarily to be a specific embodiment for (multiple-)beam indication.

A—Formats
  A-1: Fixed format
  A-2: Dynamic format
B—Features (e.g. content of the indication or content to be provided together with the beam indication)
  B-1: Serving Cell information
  B-2: BWP information
  B-2: CORESET information
  B-3: TCI state information
  B-4: CSI-RS and/or SRS resource set information
  B-5: CSI report information
  B-6: NUL/SUL information
  B-7: PUCCH resource information
  B-8: Activation/Deactivation information
  B-9: search space information
  B-10: panel related information and/or panel activation/deactivation information
  B-11: beam addition, change, and/or release information
  B-12: information for number of CORESET(s) and/or TCI state(s)
  B-13: reserved bit Some of the information mentioned above could be represented by an index and/or a bitmap in a beam indication (e.g. MAC (Medium Access Control) CE (Control Element)).

The beam indication may be a RRC (Radio Resource Control) signal, MAC CE, and/or PHY (Physical) signaling. It is noted that "beam" or the concept of beam can be replaced with or referred to one or any of the followings:
  Spatial QCL assumption,
  Antenna port,
  TCI state,
  DL/UL RS index,
  Spatial parameter, filter
  Transmission precoder.

Figure 8:
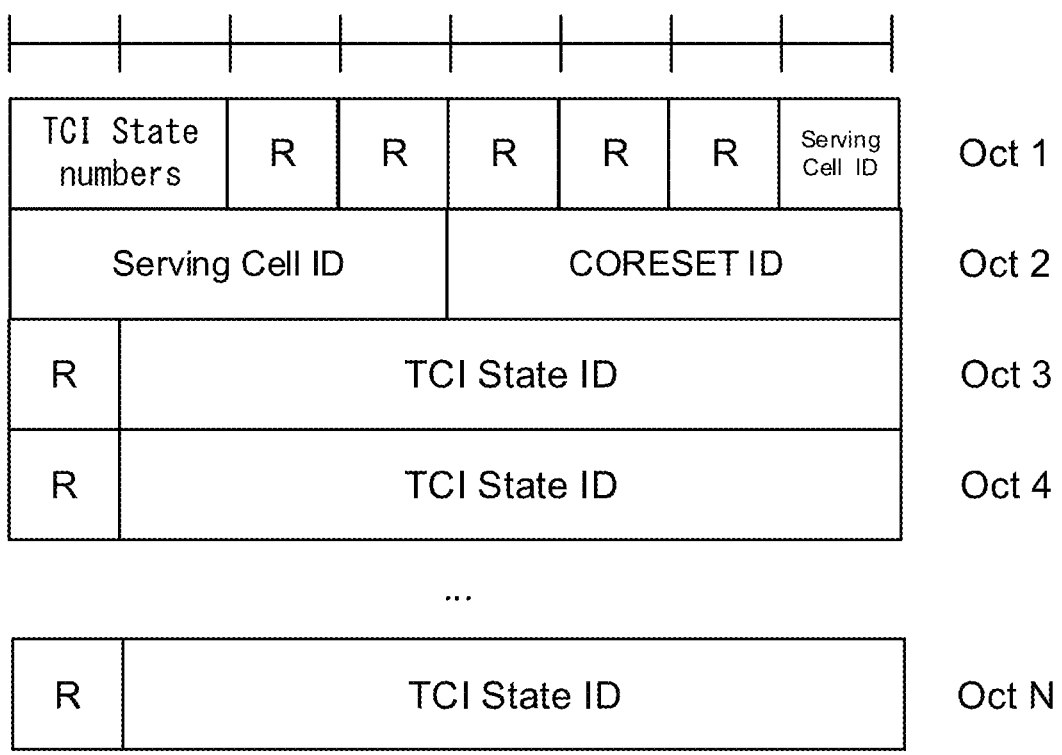
FIG. 8 is a diagram according to one exemplary embodiment.
Figure 9:
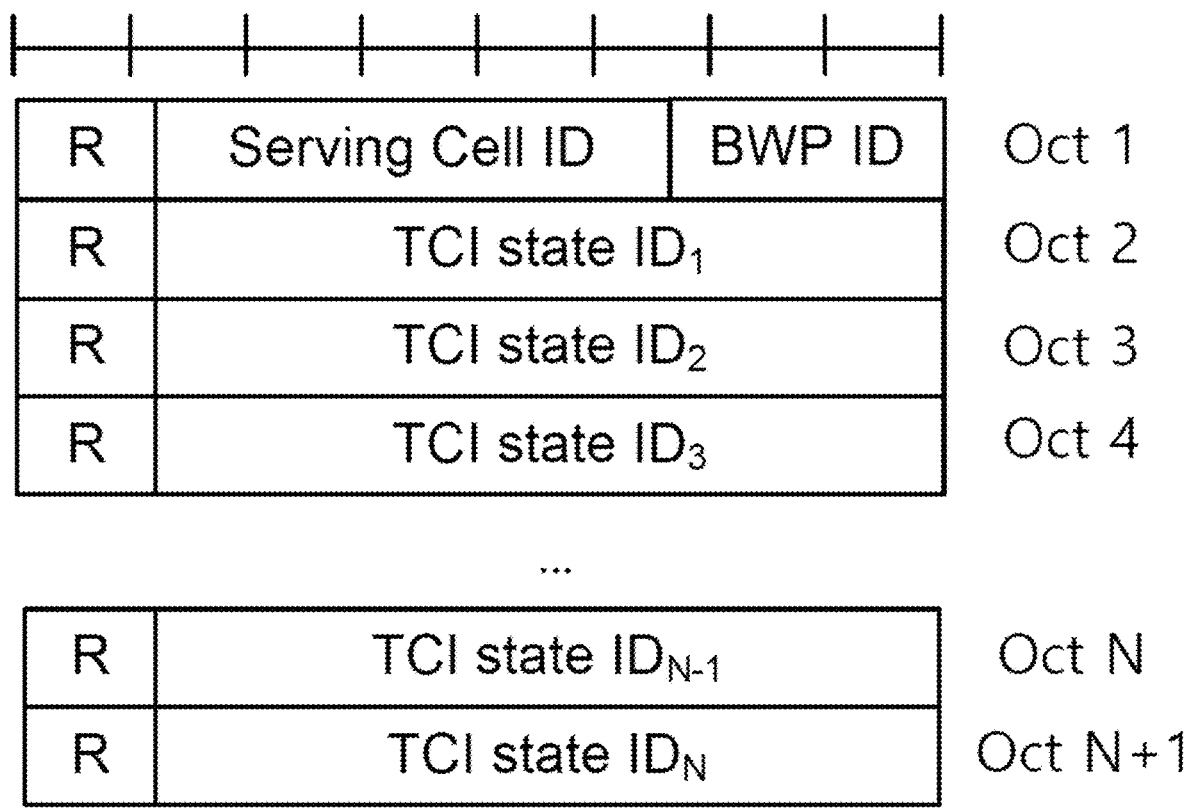
FIG. 9 is a diagram according to one exemplary embodiment.

In one embodiment, alternatives or examples for (multiple-)beam indication are as follows:
  Alternative 1—NW could indicate multiple beams based on one beam indication (an illustration is shown in FIG. 8 and FIG. 9)

The beam indication could be a dynamic format, e.g. length of the beam indication or number of fields in the beam indication is dynamic. The format of the beam indication may depend on how many beams are included or indicated in the beam indication. A general description of Alternative 1 could be shown in FIG. 8. FIG. 8 shows an exemplary embodiment from Alternative 1, wherein the format of the beam indication may depend on how many beams are included or indicated in the beam indication, and applied DL channel is PDCCH herein. Similar indication could be also applied for PDSCH indication case. FIG. 9 shows a possible exemplary embodiment for PDSCH beam indication from Alternative 1. This alternative could be also applied for other DL channels or DL RS. The beam indication being a dynamic format could mean that the beam indication does not indicate one or more beams via a bitmap with (semi-statically) fixed length and/or does not include a bitmap with (semi-statically) fixed length, wherein the bitmap is for beam indication.

The beam indication may include a field to indicate how many beams (e.g. the number of beams) are included in the beam indication (to be activated). The beam indication could include one or more TCI state IDs to indicate the UE to activate TCI state(s) associated with the TCI state ID(s). If the beam indication indicates two beams at the same time, the format of the beam indication may include two beam information (e.g. two TCI state IDs or numbers, two spatial QCL assumption, two RS resource index). More specifically, the number or fields of one or more than one of the features mentioned above (e.g. B-1, B-2, . . . , B-13) may not be dependent on the number of beams. For example, no matter how many beams included in the beam indication, the amount of indicated serving cell ID or CORESET ID or BWP ID may be only one within the beam indication.

Alternatively or additionally, the number of beams may be implicitly indicated via a MAC subheader (e.g. FIG. 6.1.2-1, FIG. 6.1.2-2, or FIG. 6.1.2-3 of 3GPP TS 38.321). For example, the number of beams may be dependent on the value of L field in the MAC subheader (corresponding to the beam indication). As another example, the number of beams may be dependent on the type of the MAC subheader (such as LCID (Logical Channel ID) in the MAC subheader corresponding to the beam indication).

The UE could use multiple beams indicated by the beam indication to receive, monitor, and/or transmit the DL/UL channel or RS concurrently. The UE could use multiple beams among total beams indicated by the beam indication to receive, monitor, and/or transmit the DL/UL channel or RS concurrently.

For example, assuming the UE is using a first beam to receive, monitor, and/or transmit a DL/UL channel. The first beam could be activated by a previously received beam indication or legacy MAC CE (such as TCI States Activation/Deactivation for UE-specific PDSCH MAC CE or TCI State Indication for UE-specific PDCCH MAC CE). Later, when the UE receives a beam indication including at least a first beam information and a second beam information in one signal, the UE may (start to) use the first beam and the second beam to receive, monitor, and/or transmit the DL/UL channel or RS (concurrently). More specifically, the UE may further add or activate or utilize the second beam to receive, monitor, and/or transmit the DL/UL channel or RS (concurrently).

The UE could deactivate a beam (e.g. TCI state) based on absence of TCI state ID, associated with the beam, in the beam indication. For example, assuming the UE is using a first beam (activated by a previously received beam indication or a legacy MAC CE (such as TCI States Activation or Deactivation for UE-specific PDSCH MAC CE or TCI State Indication for UE-specific PDCCH MAC CE)) to receive, monitor, and/or transmit a DL/UL channel or RS. Later, when the UE receives a beam indication at least including a second beam information and a third beam information in one signal (while not including the first beam information), the UE may (start to) use the second beam and the third beam to receive, monitor, and/or transmit the DL/UL channel or RS (concurrently). More specifically, (based on the beam indication) the UE may release or deactivate or not utilize the first beam. (Based on the beam indication) the UE may activate, or utilize the second and the third beam to receive, monitor, and/or transmit the DL/UL channel or RS (concurrently).

As another example, assuming the UE is using a first beam and a second beam (activated by a previously received beam indication or a legacy MAC CE (such as TCI States Activation/Deactivation for UE-specific PDSCH MAC CE or TCI State Indication for UE-specific PDCCH MAC CE)) to receive, monitor, and/or transmit a DL/UL channel or RS. Later, when the UE receives a beam indication MAC including only a third beam information (or at least the third beam information, while not including the first beam information and the second beam information), the UE may (start to) use (only) the third beam to receive, monitor, and/or transmit the DL/UL channel or RS. More specifically, (based on the beam indication) the UE may release or deactivate not utilize the first beam and the second beam. (Based on the beam indication) the UE may activate the third beam to receive, monitor, and/or transmit the DL/UL channel or RS.

As another example, assuming the UE is using a first beam and a second beam (activated by a previously received beam indication or a legacy MAC CE (such as TCI States Activation/Deactivation for UE-specific PDSCH MAC CE or TCI State Indication for UE-specific PDCCH MAC CE)) to receive, monitor, and/or transmit a DL/UL channel or RS. Later, when the UE receives a beam indication including only a first beam information (or at least the first beam information, while not including the second beam information), the UE may (start to) use (only) the first beam to receive, monitor, and/or transmit the DL/UL channel or RS. More specifically, the UE may release or deactivate or not utilize the second beam (based on the beam indication).

Figure 11:
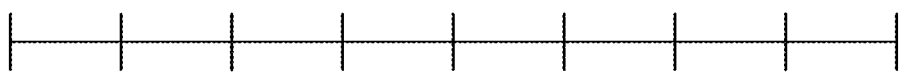
FIG. 11 is a reproduction of FIG. 6.1.3.14-1 of 3GPP TS 38.321 V15.3.0.

More specifically, the beam indication may further include one or more than one of the features (e.g. B-1, B-2, . . . , B-13) mentioned above. The UE may (implicitly) add/activate or release/deactivate the beam for transmitting or receiving the DL/UL channel or RS based on the beam indication. If the NW would like to indicate only one serving beam for the UE to receive or detect one DL transmission concurrently, the NW may use a beam indication with (semi-statically) fixed format, e.g. FIG. 11 (which is a reproduction of FIG. 6.1.3.14-1 of 3GPP TS 38.321 V15.3.0) and FIG. 12, while dynamic format for beam indication as mentioned in this Alternative could be also used in this case. On the other hand, if the NW would like to indicate multiple serving beams for the UE to receive or detect one DL transmission concurrently, the NW may use a beam indication with dynamic format as mentioned in this Alternative.

The technical effect of this method is that the beam indication with dynamic format could be flexibly used for beam indication for any number of beams (in future release).

Figure 10:
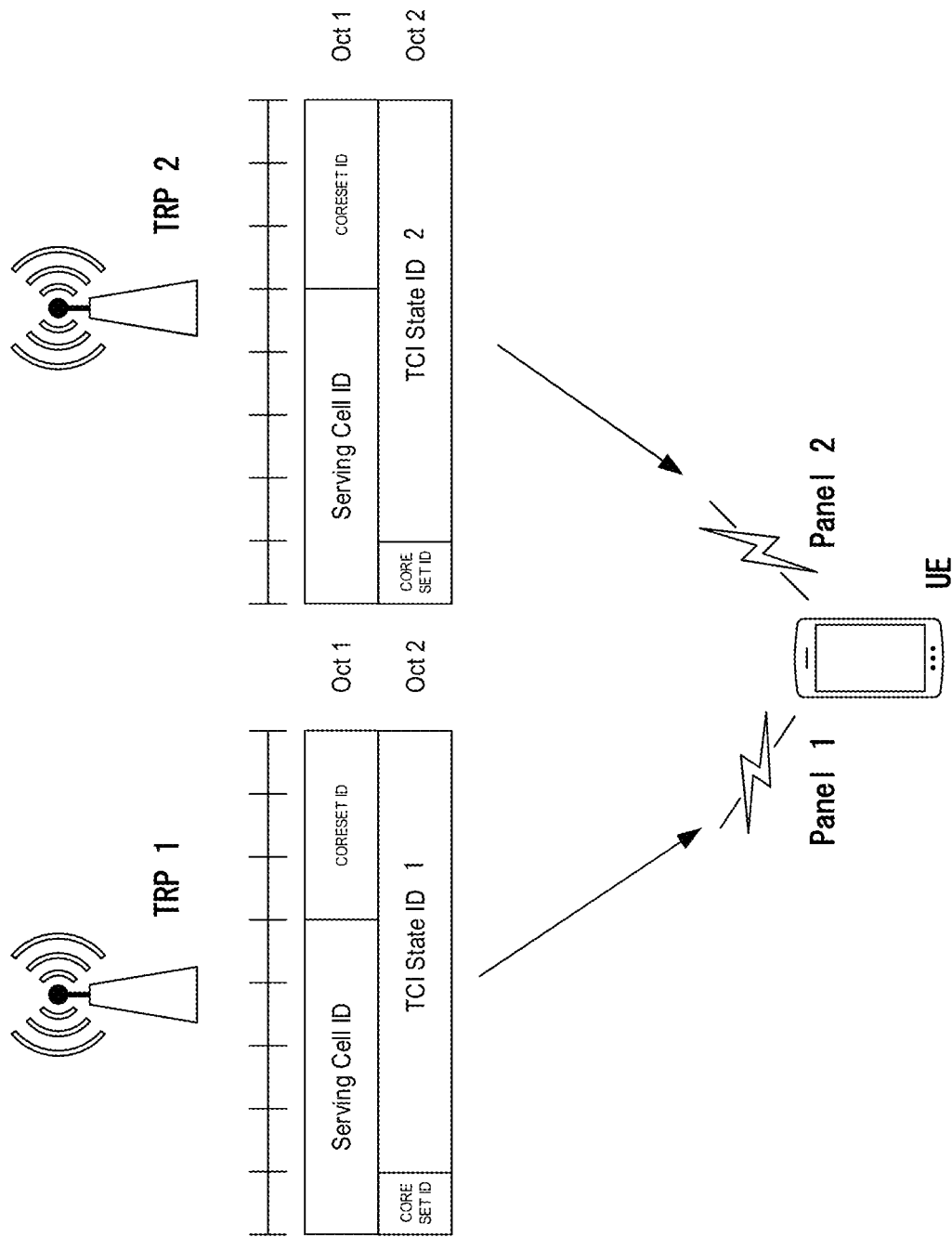
FIG. 10 is a diagram according to one exemplary embodiment.

Alternative 2—NW could indicate multiple beams via different TRPs or to different Panels of the UE (an illustration is shown in FIG. 10)

If the NW would like to indicate multiple beams for the UE to receive, monitor, and/or transmit the DL/UL channel or RS of a cell, the NW may transmit different beam indications via different TRPs of the cell. For example, the NW may transmit a first beam indication which includes a first beam information (e.g. TCI state 1 or spatial QCL assumption 1) to the UE via a first TRP. When the UE receives the first beam indication via the first TRP, the UE may consider the first beam information included in the first beam indication is for the communication (e.g. reception, monitoring, or transmission) of the first TRP. On the other hand, the NW may transmit a second beam indication which includes a second beam information (e.g. TCI state 2 or spatial QCL assumption 2) to the UE via a second TRP. When the UE receives the second beam indication via the second TRP, the UE may consider the second beam information included in the second beam indication is for the communication (e.g. reception, monitoring, or transmission) of the second TRP.

If the NW would like to indicate multiple beams for the UE to receive, monitor, and/or transmit the DL/UL channel of the cell, the NW may transmit different beam indications to different panels of the UE. For example, the NW may transmit a first beam indication which includes a first beam information (e.g. TCI state 1 or spatial QCL assumption 1) to a first panel of the UE. When the UE receives the first beam indication via the first panel, the UE may consider the first beam information included in the first beam indication is used for the first panel. On the other hand, the NW may transmit a second beam indication which includes a second beam information (e.g. TCI state 2 or spatial QCL assumption 2) to a second panel of the UE. When the UE receives the second beam indication via the second panel, the UE may consider the second beam information included in the second beam indication is used for the second panel.

More specifically, the first beam indication may not impact the beam usage of the second TRP or the second panel of the UE. The second beam indication may not impact the beam usage of the first TRP or the first panel of the UE. More specifically, the first beam indication and/or the second beam indication may be transmitted via the same cell.

Alternatively or additionally, the first beam indication may impact the beam usage of the second TRP or the second panel of the UE if the beam indication includes the corresponding information of TRP or panel. More specifically, the first beam indication and/or the second beam indication may be transmitted via different cells. The beam indication could be cross-TRP/cross-panel scheduling. For example, a first TRP could schedule the UE to receive a beam indication from a second TRP.

As another example, assuming the UE is using a first beam to receive, monitor, and/or transmit a DL/UL channel or RS via a first TRP or panel. When the UE receives a second beam indication via a second TPR or second panel (which may be scheduled by a first TRP), the UE may start to use a first beam to receive, monitor, and/or transmit a DL/UL channel or RS via a first TRP or panel and use a second beam to receive, monitor, and/or transmit the DL/UL channel or RS via a second TRP or panel concurrently.

More specifically, the NW could indicate the UE to use which panel to receive the beam indication. The beam indication may further include one or more than one of the features (e.g. B-1, B-2, . . . , B-13) mentioned above.

The technical effect of this method is that the current beam indication is not needed to be optimized. How to use the beams on which panels (or on which TRPs) could be implicitly indicated.

Alternative 3—NW could indicate multiple beams based on a specific rule by a beam indication Activation/Deactivation The beam indication may include an indication of activation or deactivation (state) for (serving) beam(s). If the NW would like to indicate multiple beams for the UE to receive, monitor, and/or transmit the DL/UL channel or RS, the NW may send one or multiple beam indications to activate or indicate multiple beams for the UE. If the NW would like to change the beams which have been activated to a new beam(s), the NW may deactivate the original beam(s), then activate the new beam(s). If the NW would like to add a new beam for the UE to receive, monitor, and/or transmit the DL/UL channel or RS, the NW may further activate a beam which is different from the current serving beam(s) of the UE.

For example, assuming the UE is using a first beam to receive, monitor, and/or transmit a DL/UL channel. When the UE receives a beam indication including an activation command and an information of a second beam, the UE may (start to) use the first beam and the second beam at the same time to receive, monitor, and/or transmit a DL/UL channel or RS. More specifically, when the UE receives the beam indication including an activation command and an information of a second beam, the UE may activate or utilize the second beam.

As another example, assuming the UE is using a first beam and a second beam at the same time to receive, monitor, and/or transmit a DL/UL channel or RS. When the UE receives a beam indication including a deactivation command and an information of the first beam, and receives another beam indication including an activation command and an information of a third beam, the UE may deactivate the first beam and activate the third beam. Therefore, the UE may start to use the second beam and the third beam to receive, monitor, and/or transmit a DL/UL channel or RS.

Alternatively or additionally, the NW could only activate or deactivate one beam by one packet or signal. For example, the beam indication may only comprise one field for activation or deactivation, and another field for indicating an information of beam (e.g. TCI state ID or spatial QCL assumption or RS index). In one embodiment, if the NW would like to change a serving beam, the NW may need to send a beam indication to deactivate the serving beam and another beam indication to activate a new beam.

Alternatively or additionally, the NW could activate or deactivate multiple beams by one packet or signal. More specifically, the activation or deactivation state of the beams may be indicated by a bit map. The NW could activate and deactivate the beam(s) at the same time by one signal.

Alternatively or additionally, the NW could only activate or only deactivate the beam(s) by one packet or signal. More specifically, the beam indication may include a field for indicating activation or deactivation, and another field for indicating an information of beam (e.g. TCI state ID or spatial QCL assumption or RS index). The beam indication may further include one or more than one of the features (e.g. B-1, B-2, . . . , B-13) mentioned above.

Further elaborations applied for above alternatives or mentioned concepts are discussed below.

More specifically, if the NW would like to release or to indicate a UE to not utilize a serving beam, the NW may indicate a specific information by the beam indication. For example, the NW may set a specific value for serving cell ID, BWP (Bandwidth Part) ID, CORESET ID, TCI state ID, panel ID, and/or, etc.

More specifically, if the NW would like to indicate only one serving beam for the UE to monitor PDCCH on a CORESET, the NW may use a beam indication (described in 3GPP TS 38.321), wherein the format of the beam indication is shown in FIG. 12. Else if the NW would like to indicate multiple serving beams for the UE to monitor PDCCH on a CORESET, the NW may use one or multiple alternatives mentioned above.

More specifically, the beam indications mentioned above may be associated with different LCID. The beam indications mentioned above may be indicated for a TRP, a serving cell, a CORESET, and/or a BWP.

In one embodiment, the format of the beam indication may be dynamic format or fixed format. The format of the beam indication may be referred to as at least one of the followings: length of the beam indication, order of fields included in the beam indication, and/or number of bytes included in the beam indication.

In one embodiment, the DL channel mentioned above may be PDCCH or PDSCH. The UL channel mentioned above may be PRACH, PUCCH or PUSCH. The packet mentioned above may be a PDU or a SDU. The signal mentioned above may be a RRC signal, MAC CE, or a PHY signal.

Figure 13:
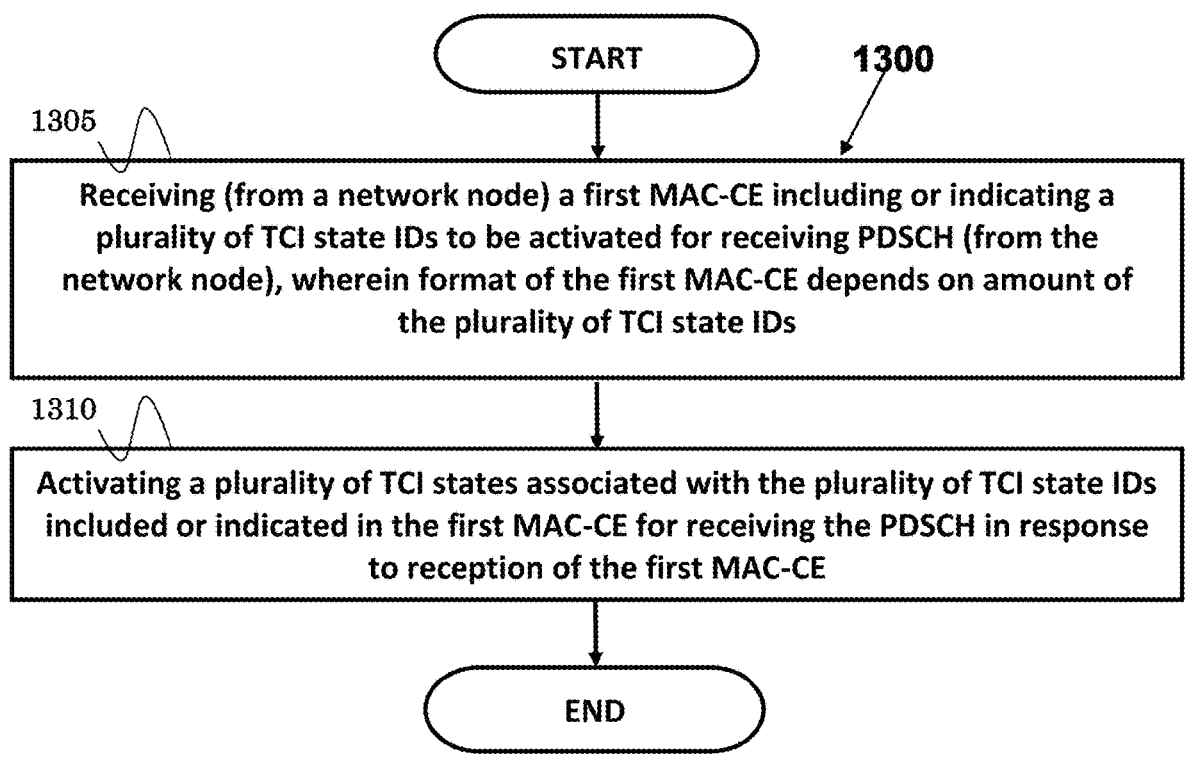
FIG. 13 is a flow chart according to one exemplary embodiment.

FIG. 13 is a flow chart 1300 according to one exemplary embodiment from the perspective of a UE. In step 1305, the UE receives (from a network node) a first MAC-CE (Medium Access Control-Control Element) including or indicating a plurality of TCI (Transmission Configuration Indication) state IDs (Identities) to be activated for receiving PDSCH (Physical Downlink Shared Channel) (from the network node), wherein format of the first MAC-CE depends on amount of the plurality of TCI state IDs. In step 1310, the UE activates a plurality of TCI states associated with the plurality of TCI state IDs included or indicated in the first MAC-CE for receiving the PDSCH in response to reception of the first MAC-CE.

In one embodiment, the UE could receive the PDSCH via multiple TCI states among the plurality of TCI states concurrently. Furthermore, the UE could receive (from the network node) a second MAC-CE including a bitmap, wherein a bit of the bitmap set to 1 indicates to activate a specific TCI state for receiving the PDSCH and the bit set to 0 indicates to deactivate the specific TCI state for receiving the PDSCH. The UE could activate the specific TCI state for receiving the PDSCH if the bit is set to 1, and the UE could deactivate the specific TCI state for receiving the PDSCH if the bit is set to 0.

In one embodiment, the UE could deactivate at least one TCI state in response to reception of the first MAC-CE, wherein at least one TCI state ID associated with the at least one TCI state is not included in the first MAC-CE. The UE could deactivate at least one TCI state in response to reception of the first MAC-CE if at least one TCI state ID associated with the at least one TCI state is not included in the first MAC-CE. The UE could activate the at least one TCI state based on the first MAC CE or the second MAC-CE.

In one embodiment, the UE could derive the format of the first MAC-CE based on a field in a MAC subheader or a field in the first MAC-CE. The first MAC-CE could include at least one of the followings: serving cell information and/or BWP (Bandwidth Part) information. The format of the first MAC-CE could include at least one of the followings: length of the first MAC-CE, order of fields included in the first MAC-CE, number of fields included in the first MAC-CE, and/or number of bytes included in the first MAC-CE.

In one embodiment, a TCI state could associate one or two DL (Downlink) reference signals with a corresponding quasi-colocation (QCL) type.

Referring back to FIGS. 3 and 4, in one exemplary embodiment of a UE, the device 300 includes a program code 312 stored in the memory 310. The CPU 308 could execute program code 312 to enable the UE (i) to receive (from the network node) a first MAC-CE including or indicating a plurality of TCI state IDs to be activated for receiving PDSCH (from the network node), wherein format of the first MAC-CE depends on amount of the plurality of TCI state IDs, and (ii) to activate a plurality of TCI states associated with the plurality of TCI state IDs included or indicated in the first MAC-CE for receiving the PDSCH in response to reception of the first MAC-CE. Furthermore, the CPU 308 can execute the program code 312 to perform all of the above-described actions and steps or others described herein.

Figure 14:
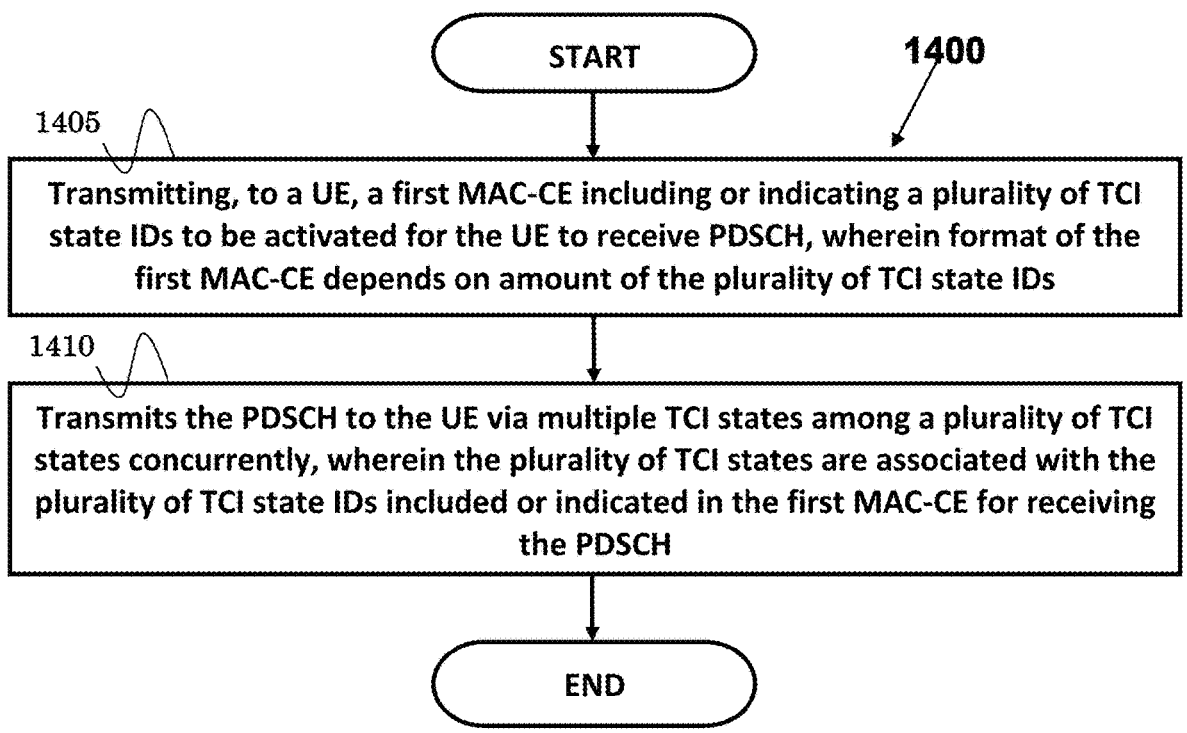
FIG. 14 is a flow chart according to one exemplary embodiment.

FIG. 14 is a flow chart 1400 according to one exemplary embodiment from the perspective of a network. In step 1405, the network transmits, to a UE, a first MAC-CE (Medium Access Control-Control Element) including or indicating a plurality of TCI (Transmission Configuration Indication) state IDs (Identities) to be activated for the UE to receive PDSCH (Physical Downlink Shared Channel), wherein format of the first MAC-CE depends on amount of the plurality of TCI state IDs. In step 1410, the network transmits the PDSCH to the UE via multiple TCI states among a plurality of TCI states concurrently, wherein the plurality of TCI states are associated with the plurality of TCI state IDs included or indicated in the first MAC-CE for receiving the PDSCH.

In one embodiment, the network could transmit the PDSCH in a way that the UE is able to receive the PDSCH via the multiple TCI states among the plurality of TCI states concurrently. In one embodiment, the network transmits the PDSCH to the UE via the multiple TCI states among the plurality of TCI states concurrently could mean or be referred to as that the network transmits the PDSCH in a way that the UE is able to receive the PDSCH via the multiple TCI states among the plurality of TCI states concurrently.

In one embodiment, the network could transmit a second MAC-CE, to the UE, including a bitmap, wherein a bit of the bitmap set to 1 indicates the UE to activate a specific TCI state for receiving the PDSCH and the bit set to 0 indicates the UE to deactivate the specific TCI state for receiving the PDSCH.

In one embodiment, the first MAC-CE could indicate, at least one TCI state to be deactivated, by not including or indicating at least one TCI state ID associated with the at least one TCI state.

In one embodiment, the network could activate the at least one TCI state by the first MAC-CE or by the second MAC-CE. The first MAC CE could include at least one of the followings: serving cell information and/or BWP (Bandwidth Part) information. The format of the first MAC-CE could include at least one of the followings: length of the first MAC-CE, order of fields included in the first MAC-CE, number of fields included in the first MAC-CE, and/or number of bytes included in the first MAC-CE.

In one embodiment, a TCI state associates one or two DL (Downlink) reference signals with a corresponding quasi-colocation (QCL) type.

Referring back to FIGS. 3 and 4, in one exemplary embodiment of a network, the device 300 includes a program code 312 stored in the memory 310. The CPU 308 could execute program code 312 to enable the network (i) to transmit, to a UE, a first MAC-CE including or indicating a plurality of TCI state IDs to be activated for the UE to receive PDSCH, wherein format of the first MAC-CE depends on amount of the plurality of TCI state IDs, and (ii) to transmit the PDSCH to the UE via multiple TCI states among a plurality of TCI states concurrently, wherein the plurality of TCI states are associated with the plurality of TCI state IDs included or indicated in the first MAC-CE for receiving the PDSCH. Furthermore, the CPU 308 can execute the program code 312 to perform all of the above-described actions and steps or others described herein.

Figure 15:
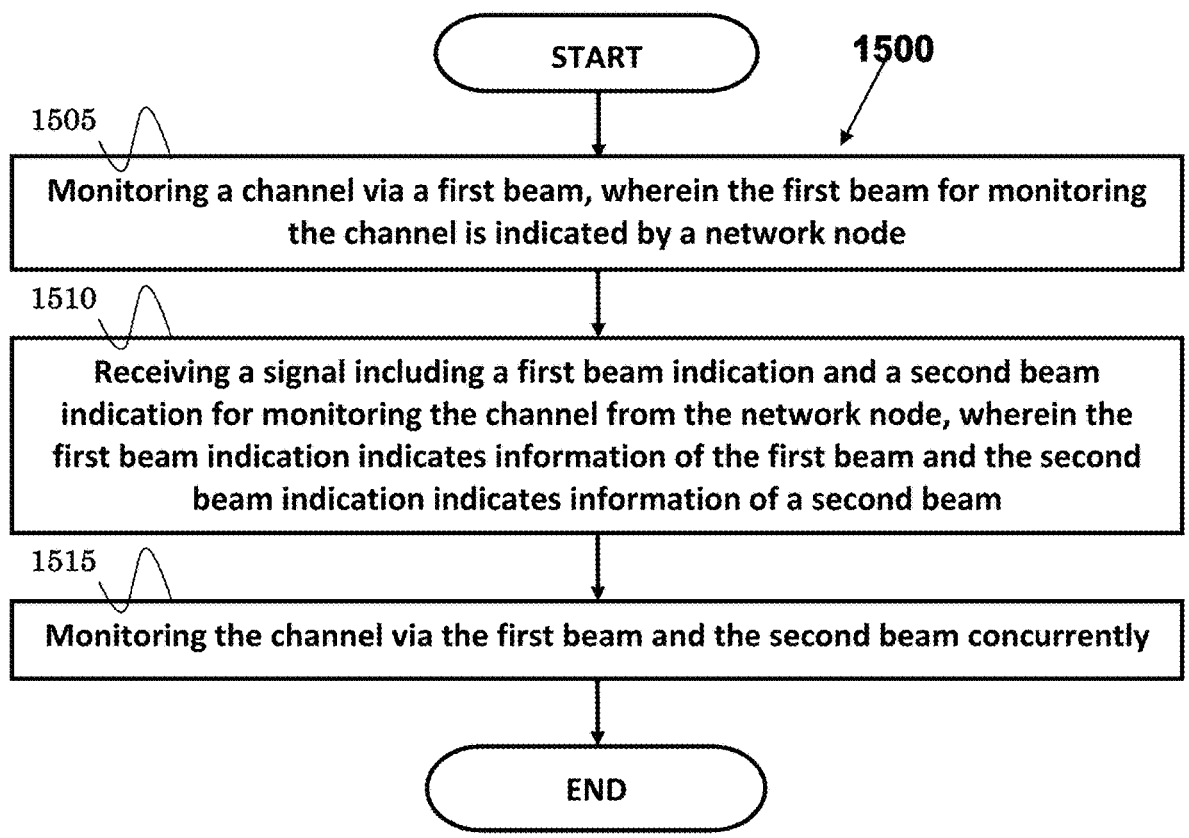
FIG. 15 is a flow chart according to one exemplary embodiment.

FIG. 15 is a flow chart 1500 according to one exemplary embodiment from the perspective of a UE. In step 1505, the UE monitors a channel via a first beam, wherein the first beam for monitoring the channel is indicated by a network node. In step 1510, the UE receives a signal including a first beam indication and a second beam indication for monitoring the channel from the network node, wherein the first beam indication indicates information of the first beam and the second beam indication indicates information of a second beam. In step 1515, the UE monitors the channel via the first beam and the second beam concurrently.

Referring back to FIGS. 3 and 4, in one exemplary embodiment of a UE, the device 300 includes a program code 312 stored in the memory 310. The CPU 308 could execute program code 312 to enable the UE (i) to monitor a channel via a first beam, wherein the first beam for monitoring the channel is indicated by a network node, (ii) to receive a signal including a first beam indication and a second beam indication for monitoring the channel from the network node, wherein the first beam indication indicates information of the first beam and the second beam indication indicates information of a second beam, and (iii) to monitor the channel via the first beam and the second beam concurrently. Furthermore, the CPU 308 can execute the program code 312 to perform all of the above-described actions and steps or others described herein.

Figure 16:
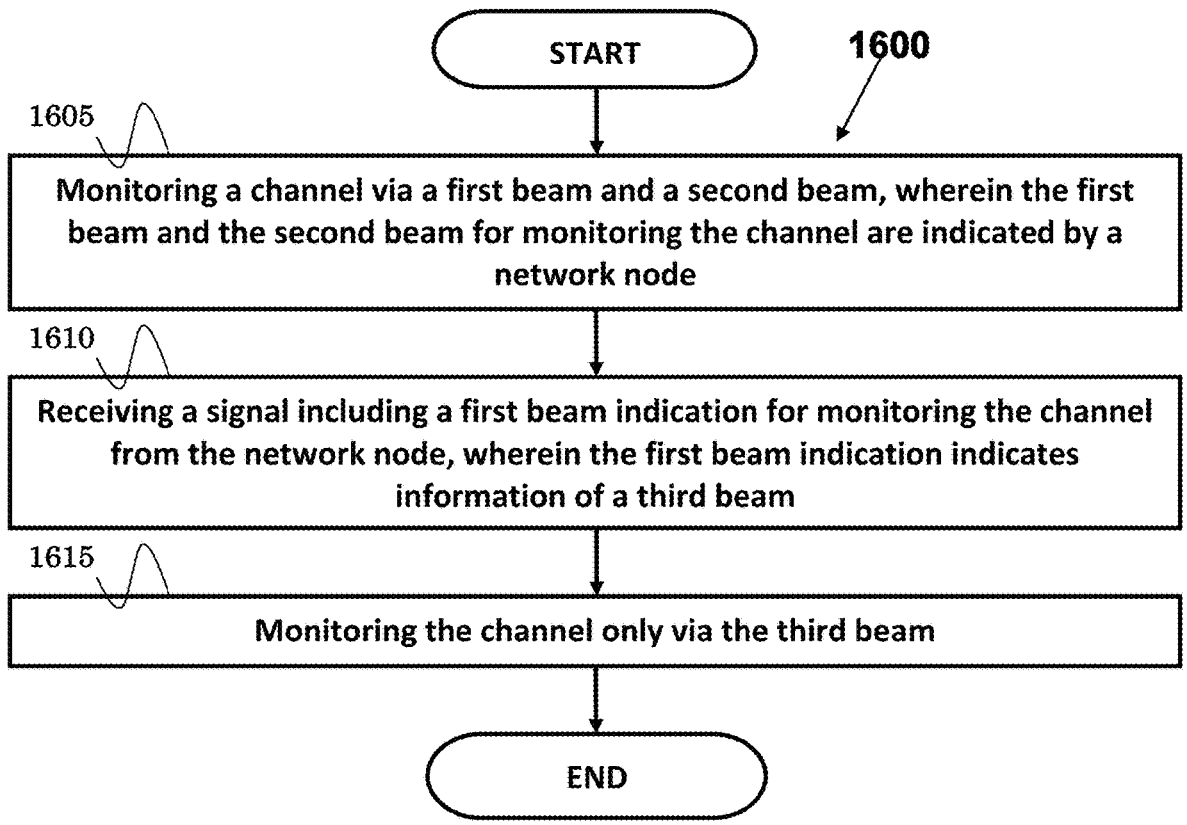
FIG. 16 is a flow chart according to one exemplary embodiment.

FIG. 16 is a flow chart 1600 according to one exemplary embodiment from the perspective of a UE. In step 1605, the UE monitors a channel via a first beam and a second beam, wherein the first beam and the second beam for monitoring the channel are indicated by a network node. In step 1610, the UE receives a signal including a first beam indication for monitoring the channel from the network node, wherein the first beam indication indicates information of a third beam. In step 1615, the UE monitors the channel only via the third beam.

Referring back to FIGS. 3 and 4, in one exemplary embodiment of a UE, the device 300 includes a program code 312 stored in the memory 310. The CPU 308 could execute program code 312 to enable the UE (i) to monitor a channel via a first beam and a second beam, wherein the first beam and the second beam for monitoring the channel are indicated by a network node, (ii) to receive a signal including a first beam indication for monitoring the channel from the network node, wherein the first beam indication indicates information of a third beam, and (iii) to monitor the channel only via the third beam. Furthermore, the CPU 308 can execute the program code 312 to perform all of the above-described actions and steps or others described herein.

In the context of the embodiments illustrated in FIGS. 13 and 14 and described above, in one embodiment, if the UE receives only one beam indication in one signal or packet, the UE could use only one beam to monitor the channel. However, if the UE receives multiple beam indications in one signal/packet, the UE could use multiple beams indicated by the multiple beam indications in the signal to monitor the channel.

Figure 17:
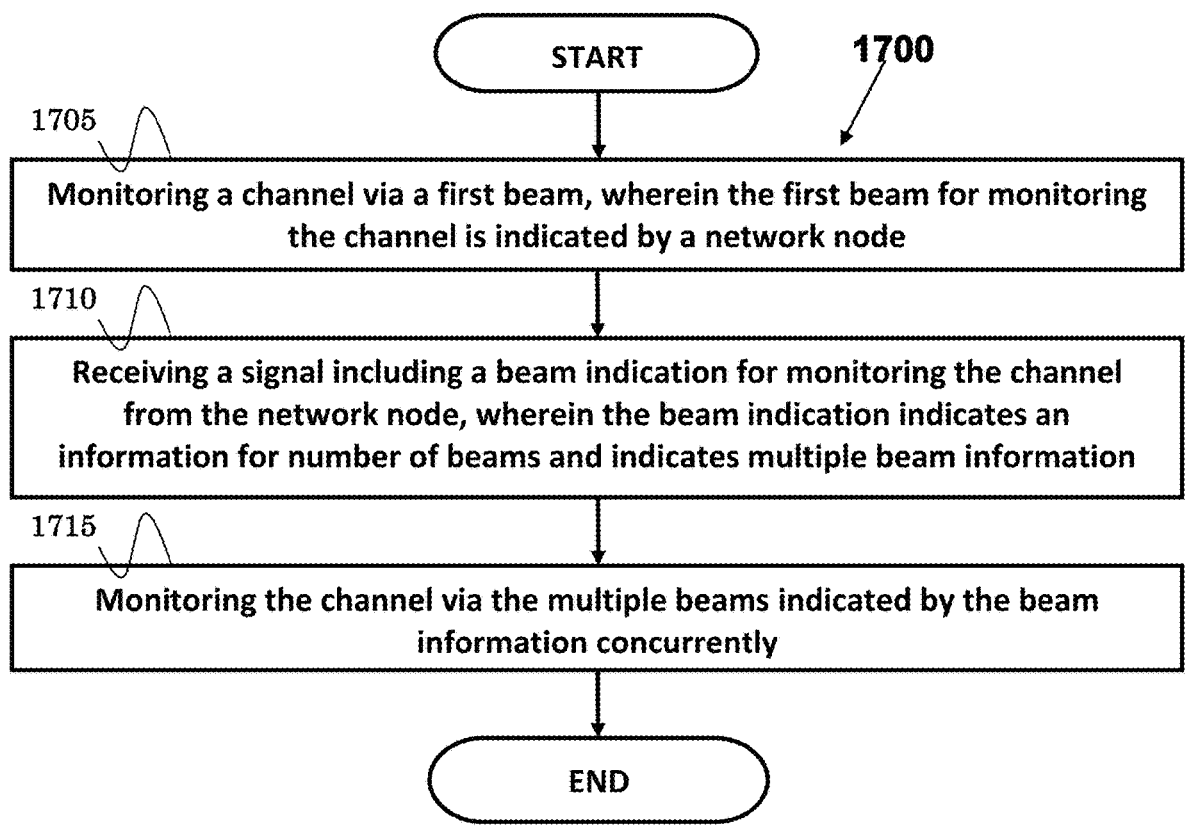
FIG. 17 is a flow chart according to one exemplary embodiment.

FIG. 17 is a flow chart 1700 according to one exemplary embodiment from the perspective of a UE. In step 1705, the UE monitors a channel via a first beam, wherein the first beam for monitoring the channel is indicated by a network node. In step 1710, the UE receives a signal including a beam indication for monitoring the channel from the network node, wherein the beam indication indicates an information for number of beams and indicates multiple beam information. In step 1715, the UE monitors the channel via the multiple beams indicated by the beam information concurrently.

In one embodiment, the UE could monitor the channel via how many beam(s) is based on the information for number of beams or based on the beam information. The format of the beam indication could be dependent on the information for number of beams.

Referring back to FIGS. 3 and 4, in one exemplary embodiment of a UE, the device 300 includes a program code 312 stored in the memory 310. The CPU 308 could execute program code 312 to enable the UE (i) to monitor a channel via a first beam, wherein the first beam for monitoring the channel is indicated by a network node, (ii) to receive a signal including a beam indication for monitoring the channel from the network node, wherein the beam indication indicates an information for number of beams and indicates multiple beam information, and (iii) to monitor the channel via the multiple beams indicated by the beam information concurrently. Furthermore, the CPU 308 can execute the program code 312 to perform all of the above-described actions and steps or others described herein.

Figure 18:
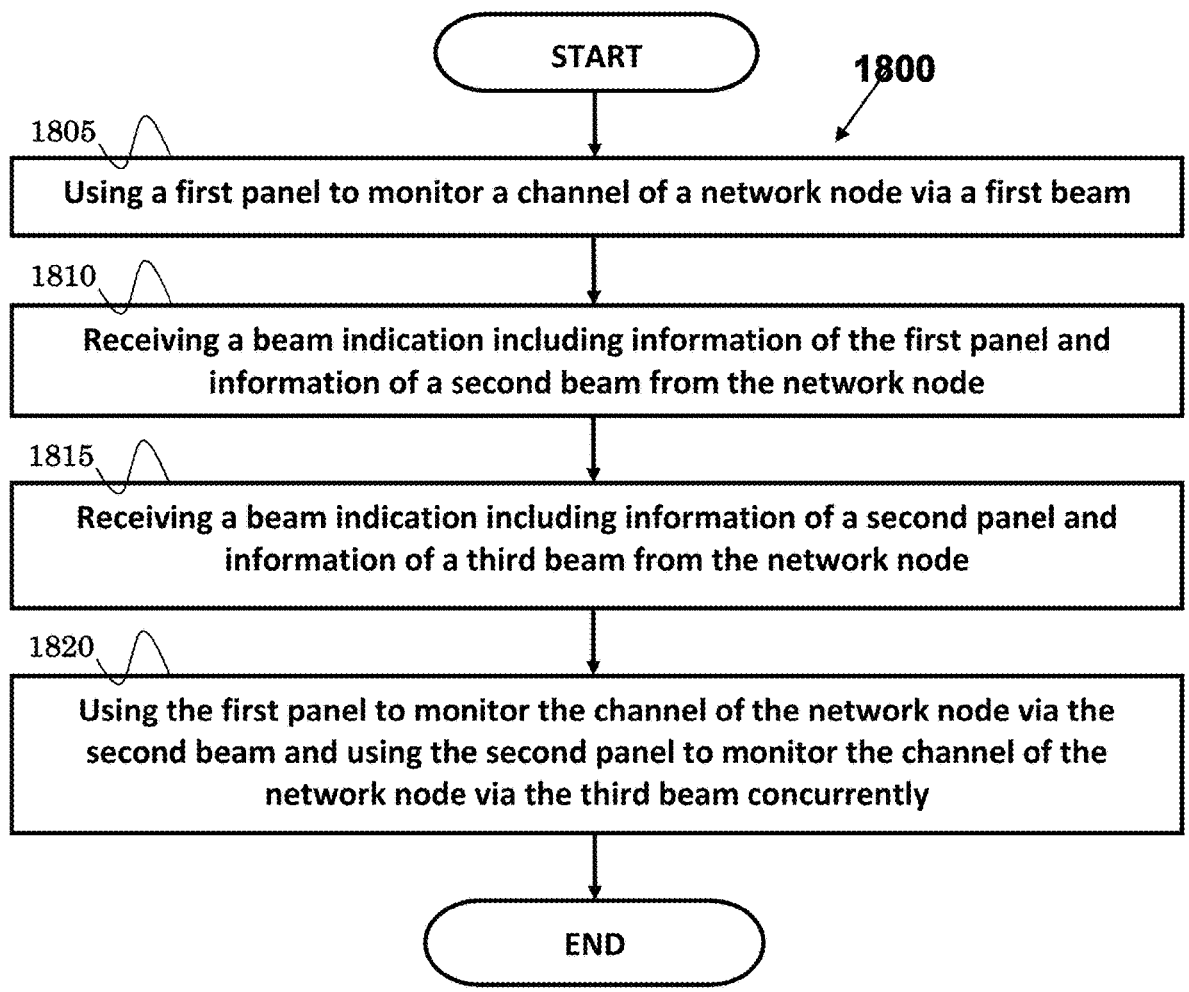
FIG. 18 is a flow chart according to one exemplary embodiment.

FIG. 18 is a flow chart 1800 according to one exemplary embodiment from the perspective of a UE. In step 1805, the UE uses a first panel to monitor a channel of a network node via a first beam. In step 1810, the UE receives a beam indication including information of the first panel and information of a second beam from the network node. In step 1815, the UE receives a beam indication including information of a second panel and information of a third beam from the network node. In step 1820, the UE uses the first panel to monitor the channel of the network node via the second beam and using the second panel to monitor the channel of the network node via the third beam concurrently.

In one embodiment, the information of the first panel could be an identification for the first panel. The beam indication could be used to indicate that the UE should monitor the channel by which panel and which beam.

Referring back to FIGS. 3 and 4, in one exemplary embodiment of a UE, the device 300 includes a program code 312 stored in the memory 310. The CPU 308 could execute program code 312 to enable the UE (i) to use a first panel to monitor a channel of a network node via a first beam, (ii) to receive a beam indication including information of the first panel and information of a second beam from the network node, (iii) to receive a beam indication including information of a second panel and information of a third beam from the network node, and (iv) to use the first panel to monitor the channel of the network node via the second beam and using the second panel to monitor the channel of the network node via the third beam concurrently. Furthermore, the CPU 308 can execute the program code 312 to perform all of the above-described actions and steps or others described herein.

In the context of the embodiments illustrated in FIGS. 13-18 and described above, in one embodiment, the UE could implicitly or explicitly activate or deactivate a serving beam based on the beam indication.

In one embodiment, the channel could be PDCCH, PDSCH, PUCCH, or PUSCH. The signal could be RRC signal, MAC CE, or PHY signal. The packet could be PDU (Packet Data Unit) or SDU (Service Data Unit). The beam could be TCI state, CSI-RS, and/or SRS.

Various aspects of the disclosure have been described above. It should be apparent that the teachings herein may be embodied in a wide variety of forms and that any specific structure, function, or both being disclosed herein is merely representative. Based on the teachings herein one skilled in the art should appreciate that an aspect disclosed herein may be implemented independently of any other aspects and that two or more of these aspects may be combined in various ways. For example, an apparatus may be implemented or a method may be practiced using any number of the aspects set forth herein. In addition, such an apparatus may be implemented or such a method may be practiced using other structure, functionality, or structure and functionality in addition to or other than one or more of the aspects set forth herein. As an example of some of the above concepts, in some aspects concurrent channels may be established based on pulse repetition frequencies. In some aspects concurrent channels may be established based on pulse position or offsets. In some aspects concurrent channels may be established based on time hopping sequences. In some aspects concurrent channels may be established based on pulse repetition frequencies, pulse positions or offsets, and time hopping sequences.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, processors, means, circuits, and algorithm steps described in connection with the aspects disclosed herein may be implemented as electronic hardware (e.g., a digital implementation, an analog implementation, or a combination of the two, which may be designed using source coding or some other technique), various forms of program or design code incorporating instructions (which may be referred to herein, for convenience, as "software" or a "software module"), or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

In addition, the various illustrative logical blocks, modules, and circuits described in connection with the aspects disclosed herein may be implemented within or performed by an integrated circuit ("IC"), an access terminal, or an access point. The IC may comprise a general purpose processor, a digital signal processor (DSP), an application specific integrated circuit (ASIC), a field programmable gate array (FPGA) or other programmable logic device, discrete gate or transistor logic, discrete hardware components, electrical components, optical components, mechanical components, or any combination thereof designed to perform the functions described herein, and may execute codes or instructions that reside within the IC, outside of the IC, or both. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

It is understood that any specific order or hierarchy of steps in any disclosed process is an example of a sample approach. Based upon design preferences, it is understood that the specific order or hierarchy of steps in the processes may be rearranged while remaining within the scope of the present disclosure. The accompanying method claims present elements of the various steps in a sample order, and are not meant to be limited to the specific order or hierarchy presented.

The steps of a method or algorithm described in connection with the aspects disclosed herein may be embodied directly in hardware, in a software module executed by a processor, or in a combination of the two. A software module (e.g., including executable instructions and related data) and other data may reside in a data memory such as RAM memory, flash memory, ROM memory, EPROM memory, EEPROM memory, registers, a hard disk, a removable disk, a CD-ROM, or any other form of computer-readable storage medium known in the art. A sample storage medium may be coupled to a machine such as, for example, a computer/processor (which may be referred to herein, for convenience, as a "processor") such the processor can read information (e.g., code) from and write information to the storage medium. A sample storage medium may be integral to the processor. The processor and the storage medium may reside in an ASIC. The ASIC may reside in user equipment. In the alternative, the processor and the storage medium may reside as discrete components in user equipment. Moreover, in some aspects any suitable computer-program product may comprise a computer-readable medium comprising codes relating to one or more of the aspects of the disclosure. In some aspects a computer program product may comprise packaging materials.

While the invention has been described in connection with various aspects, it will be understood that the invention is capable of further modifications. This application is intended to cover any variations, uses or adaptation of the invention following, in general, the principles of the invention, and including such departures from the present disclosure as come within the known and customary practice within the art to which the invention pertains.

What is claimed is:

1. A method for a UE (User Equipment), comprising:
   receiving a first MAC-CE (Medium Access Control-Control Element) including a plurality of TCI (Transmission Configuration Indication) state IDs (Identities) to be activated for receiving PDSCH (Physical Downlink Shared Channel) via multiple TCI states concurrently;
   activating a plurality of TCI states associated with the plurality of TCI state IDs included in the first MAC-CE for receiving the PDSCH;
   receiving a second MAC-CE including a bitmap to indicate activation or deactivation of a specific TCI state for receiving the PDSCH; and
   activating, in response to reception of the second MAC-CE, the specific TCI state for receiving the PDSCH if a bit of the bitmap is set to a first value, and deactivating the specific TCI state for receiving the PDSCH if the bit is set to a second value different than the first value.

2. The method of claim 1, wherein the UE receives the PDSCH via multiple TCI states among the plurality of TCI states concurrently based on the first MAC-CE.

3. The method of claim 1, wherein the UE deactivates a TCI state in response to reception of the first MAC-CE.

4. The method of claim 1, wherein the amount of the plurality of TCI state IDs is based on an L field in a MAC subheader corresponding to the first MAC-CE.

5. The method of claim 1, wherein the first MAC-CE includes at least serving cell information or BWP (Bandwidth Part) information.

6. The method of claim 1, wherein a TCI state associates at least one DL (Downlink) reference signal with a corresponding quasi-colocation (QCL) type.

7. A User Equipment (UE), the UE comprising:
   a memory; and
   a processor operatively coupled to the memory, wherein the processor is configured to execute a program code to:
   receive a first MAC-CE (Medium Access Control-Control Element) including a plurality of TCI (Transmission Configuration Indication) state IDs (Identities) to be activated for receiving PDSCH (Physical Downlink Shared Channel) via multiple TCI states concurrently;
   activate a plurality of TCI states associated with the plurality of TCI state IDs included in the first MAC-CE for receiving the PDSCH;
   receive a second MAC-CE including a bitmap to indicate activation or deactivation of at last one a specific TCI state for receiving the PDSCH; and
   activate, in response to reception of the second MAC-CE, the specific TCI state for receiving the PDSCH if a bit of the bitmap is set to a first value, and deactivating the specific TCI state for receiving the PDSCH if the bit is set to a second value different than the first value.

8. The UE of claim 7, wherein the UE receives the PDSCH via multiple TCI states among the plurality of TCI states concurrently based on the first MAC-CE.

9. The UE of claim 7, wherein the UE deactivates a TCI state in response to reception of the first MAC-CE.

10. The UE of claim 7, wherein the amount of the plurality of TCI state IDs is based on an L field in a MAC subheader corresponding to the first MAC-CE.

11. The UE of claim 7, wherein the first MAC-CE includes at least serving cell information or BWP (Bandwidth Part) information.

12. The UE of claim 7, wherein a TCI state associates at least one DL (Downlink) reference signal with a corresponding quasi-colocation (QCL) type.

13. A method for a network node, comprising:
    transmitting, to a UE (User Equipment), a first MAC-CE (Medium Access Control-Control Element) including a plurality of TCI (Transmission Configuration Indication) state IDs (Identities) to be activated for the UE to receive PDSCH (Physical Downlink Shared Channel) via multiple TCI states concurrently;

transmitting the PDSCH to the UE via multiple TCI states among a plurality of TCI states concurrently based on the first MAC-CE, wherein the plurality of TCI states are associated with the plurality of TCI state IDs included in the first MAC-CE for receiving the PDSCH; and transmitting a second MAC-CE, to the UE, including a bitmap to indicate activation or deactivation of a specific TCI state for receiving the PDSCH, wherein a bit of the bitmap set to a first value indicates the UE to activate the specific TCI state for receiving the PDSCH, and the bit set to a second value, different from the first value, indicates the UE to deactivate the specific TCI state for receiving the PDSCH.

14. The method of claim 13, wherein the amount of the plurality of TCI state IDs is based on an L field in a MAC subheader corresponding to the first MAC-CE.

15. The method of claim 13, wherein the first MAC-CE indicates a TCI state to be deactivated, by not including a TCI state ID associated with the TCI state.

16. The method of claim 13, wherein the first MAC-CE includes at least serving cell information or BWP (Bandwidth Part) information.

17. The method of claim 13, wherein a TCI state associates at least one DL (Downlink) reference signal with a corresponding quasi-colocation (QCL) type.

* * * * *